US011157867B1

(12) United States Patent
Jordan et al.

(10) Patent No.: US 11,157,867 B1
(45) Date of Patent: Oct. 26, 2021

(54) SELECTING FLIGHT ROUTES BASED ON HISTORICAL EXPOSURE

(71) Applicant: Amazon Technologies, Inc., Seattle, WA (US)

(72) Inventors: Ian Beck Jordan, Lake Forest Park, WA (US); Aaron John Kapaldo, Sammamish, WA (US); Brian Paul Whiteside, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 16/367,545

(22) Filed: Mar. 28, 2019

(51) Int. Cl.
*G06Q 10/08* (2012.01)
*G05D 1/10* (2006.01)
*G01C 21/00* (2006.01)
*B64C 39/02* (2006.01)
*G06Q 30/06* (2012.01)

(52) U.S. Cl.
CPC ..... *G06Q 10/08355* (2013.01); *B64C 39/024* (2013.01); *G01C 21/005* (2013.01); *G05D 1/104* (2013.01); *G06Q 30/0633* (2013.01); *B64C 2201/027* (2013.01); *B64C 2201/128* (2013.01); *B64C 2201/146* (2013.01)

(58) Field of Classification Search
CPC ......... G06Q 10/08355; G06Q 30/0633; G05D 1/104; G01C 21/005; B64C 39/024; B64C 2201/128; B64C 2201/146; B64C 2201/027
See application file for complete search history.

(56) References Cited

U.S. PATENT DOCUMENTS

2018/0137454 A1* 5/2018 Kulkarni ............. G08G 5/0034
2019/0189016 A1* 6/2019 Kubie ................. G05D 1/0088

* cited by examiner

*Primary Examiner* — Thomas G Black
*Assistant Examiner* — Ana D Thomas
(74) *Attorney, Agent, or Firm* — Athorus, PLLC

(57) ABSTRACT

Routes for performing missions such as deliveries by air within a region may be selected based on historic exposures to noise within the region. Where a plurality of missions are performed by aerial vehicles at or near locations within a region, noises radiated by such aerial vehicles during such missions may be tracked or determined, and the extent to which ground-based locations are exposed to such noises may be modeled accordingly. Subsequently, when another mission is to be performed by air within the region, aspects of an optimal route to be traveled by an aerial vehicle while performing the mission, including but not limited to courses, speeds, altitudes, orientations or operational characteristics of the aerial vehicle, as well as paths to be traveled by the aerial vehicle or waypoints to be reached, may be selected in a manner that takes into account historical exposures to noises within the region.

21 Claims, 28 Drawing Sheets

OPTIMAL ROUTE FROM ORIGIN TO DESTINATION WITHIN REGION

EXPOSURE SCORES FOR REGION CALCULATED BASED ON PRIOR ACTIVITY

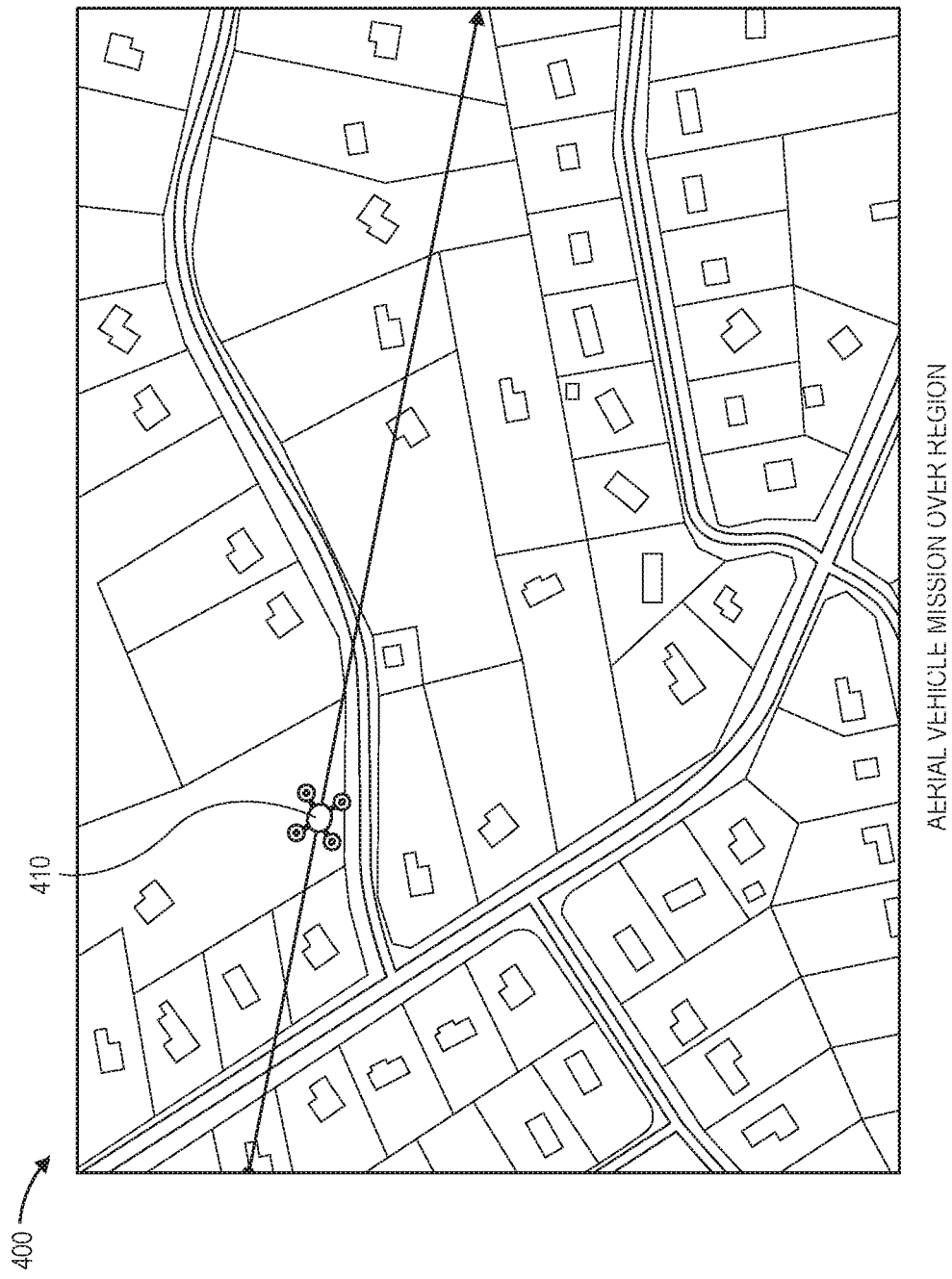

EXPOSURE SCORES DETERMINED BASED ON GEOGRAPHIC LOCATIONS FLOWN OVER DURING MISSION

EXPOSURE SCORES DETERMINED FOR PARCELS FLOWN OVER DURING MISSION

EXPOSURE SCORES CALCULATED FOR PARCELS BASED ON ESTIMATED NOISE EXPOSURE DURING MISSION

EXPOSURE SCORES DETERMINED BASED ON GEOGRAPHIC LOCATIONS FLOWN OVER DURING MISSIONS

EXPOSURE SCORES DETERMINED FOR PARCELS FLOWN OVER DURING MISSIONS

EXPOSURE SCORES CALCULATED FOR PARCELS BASED ON ESTIMATED NOISE EXPOSURE DURING MISSIONS

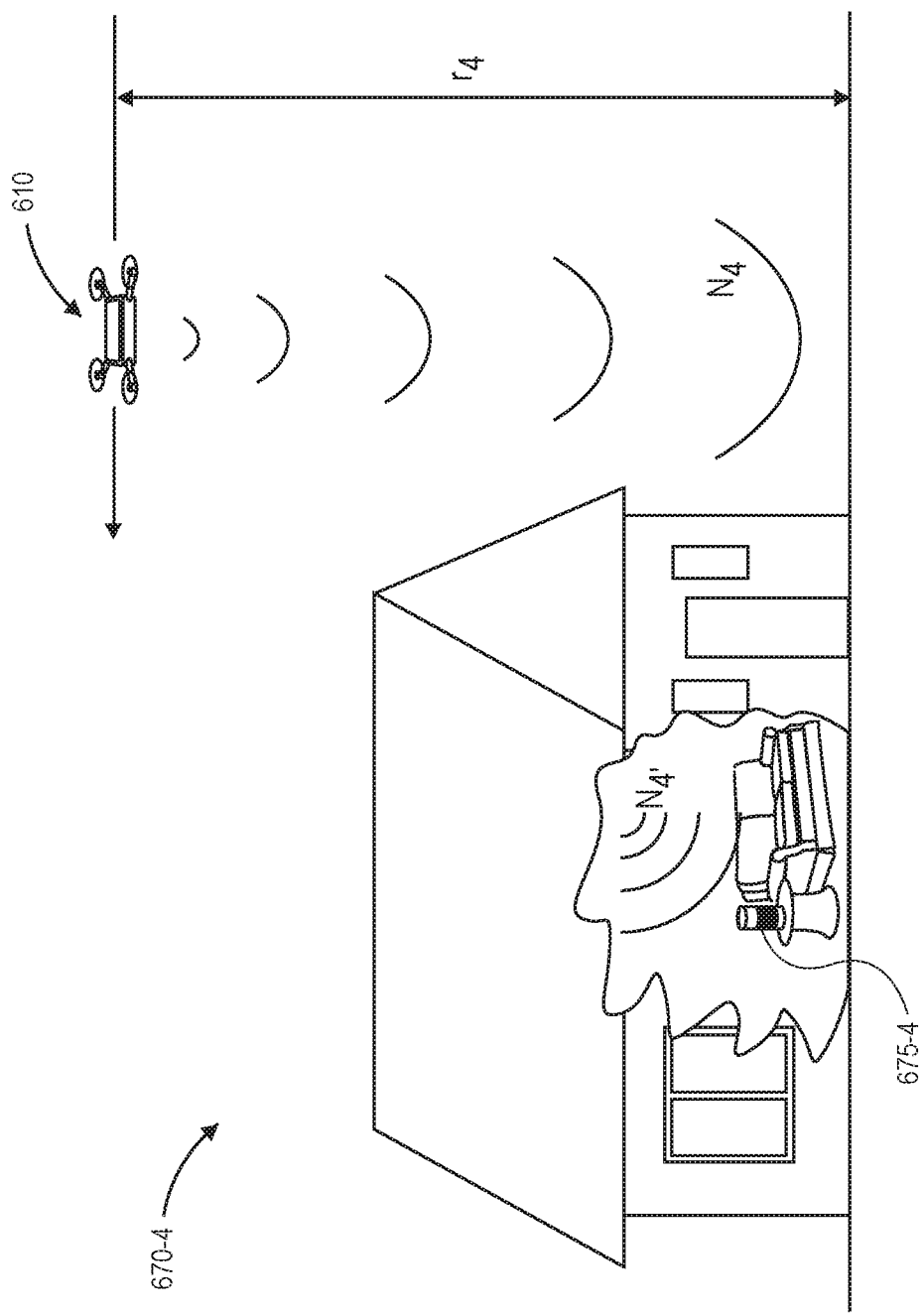

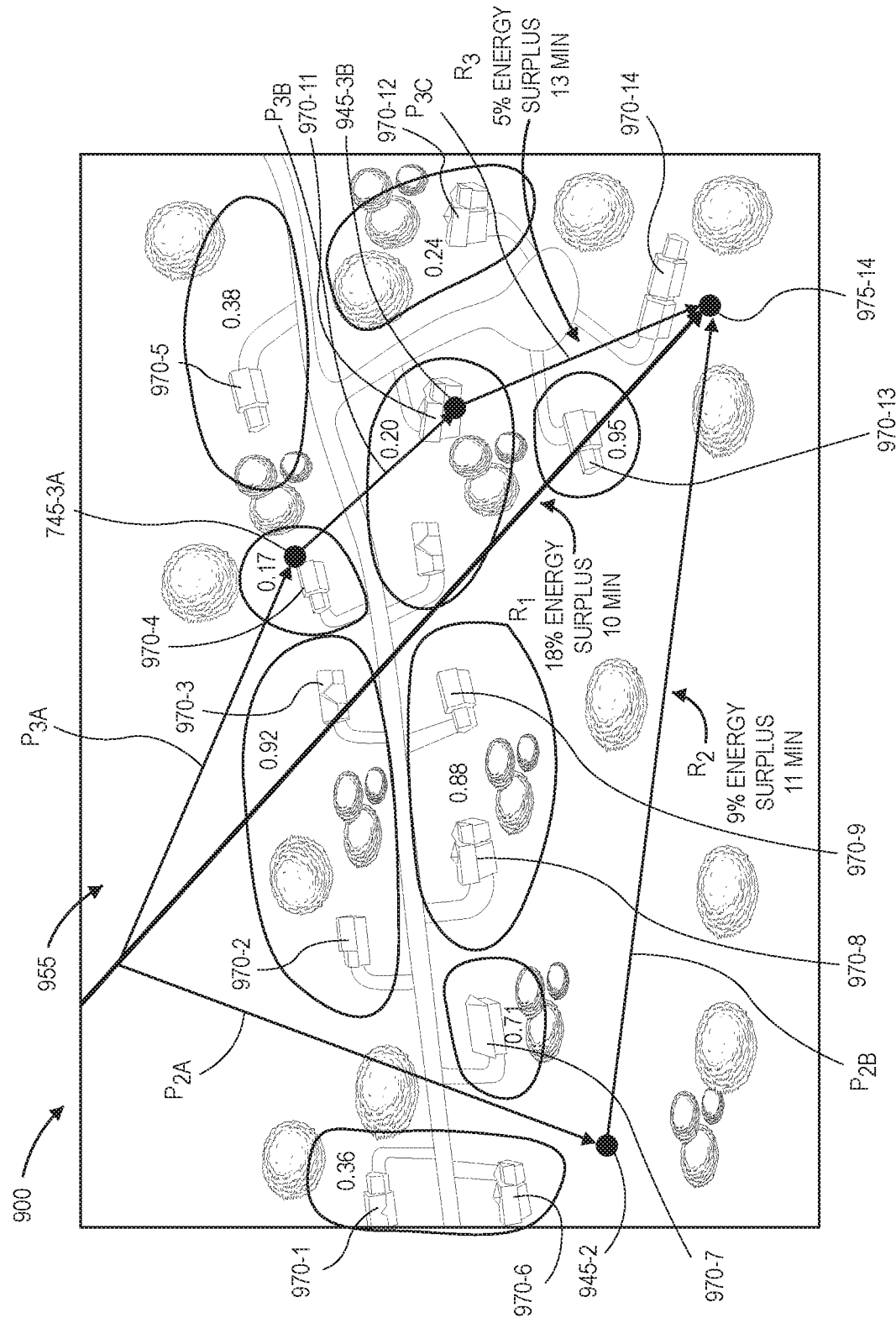
FIG. 9C MODIFICATIONS TO OPTIMAL ROUTE BASED ON MODEL OF EXPOSURE

SELECTING FLIGHT ROUTES BASED ON HISTORICAL EXPOSURE

BACKGROUND

During airborne operations, an aerial vehicle typically radiates various types of sounds, or kinetic energies released by the vibration of molecules in a medium, to airborne or ground-based environs. For example, sound may be generated in response to vibrations resulting from the rotation of one or more bodies such as shafts, e.g., by motors or other prime movers, or in response to vibrations caused by fluid flow over one or more bodies. Sound may also be generated in response to vibrations resulting from impacts or frictional contact between two or more bodies. In essence, any movement of molecules, or contact between molecules, that causes a vibration may result in the emission of sound at a pressure level or intensity, and at one or more frequencies.

The frequency and number of applications in which aerial vehicles, such as unmanned aerial vehicles (or "UAV") or drones, continue to increase over time, even as aerial vehicles become both more capable and more complex, or shrink in size. In particular, unmanned aerial vehicles have been used in making deliveries, performing monitoring operations, responding to critical issues affecting public or private safety, or other functions. Unlike large aerial vehicles such as jumbo jets or propeller planes, which are typically assigned dedicated flight paths that avoid populated areas, or instructed to maintain above altitudes or to limit radiated noise when flying over or near populated areas, some unmanned aerial vehicles are designed to fly at lower speeds and altitudes, and to travel within closer proximity to humans or other animals, or with few limitations on lateral, horizontal or vertical movements.

Occasionally, operations of unmanned aerial vehicles at low altitudes may be perceived in a negative manner by humans or other animals on the ground below. For example, when an unmanned aerial vehicle is within a hearing distance, or earshot, of a human or other animal, noises generated by the unmanned aerial vehicle, including but not limited to high-intensity or high-frequency sounds generated by rotating propellers, operating motors or vibrating frames or structures of the unmanned aerial vehicle, are readily heard by such humans or other animals. Depending on the sizes of an unmanned aerial vehicle's propellers, the operational characteristics of its motors or the shapes or dimensions of its frame or structure, the net effect of the noises generated by the unmanned aerial vehicle may be unpleasant. Moreover, the adverse effects of noise generated by aerial vehicles, or the adverse effects associated with their mere presence overhead, may be amplified where flight operations of such aerial vehicles are increasingly frequent.

BRIEF DESCRIPTION OF THE DRAWINGS

FIGS. 1A through 1F are views of aspects of one system for selecting flight routes based on historical exposure in accordance with embodiments of the present disclosure.

FIGS. 4A through 4D are views of aspects of systems for selecting flight routes based on historical exposure in accordance with embodiments of the present disclosure.

FIGS. 6A through 6C are views of aspects of systems for selecting flight routes based on historical exposure in accordance with embodiments of the present disclosure.

FIGS. 9A through 9C are views of aspects of one system for selecting flight routes based on historical exposure in accordance with embodiments of the present disclosure.

DETAILED DESCRIPTION

Figure 1A:
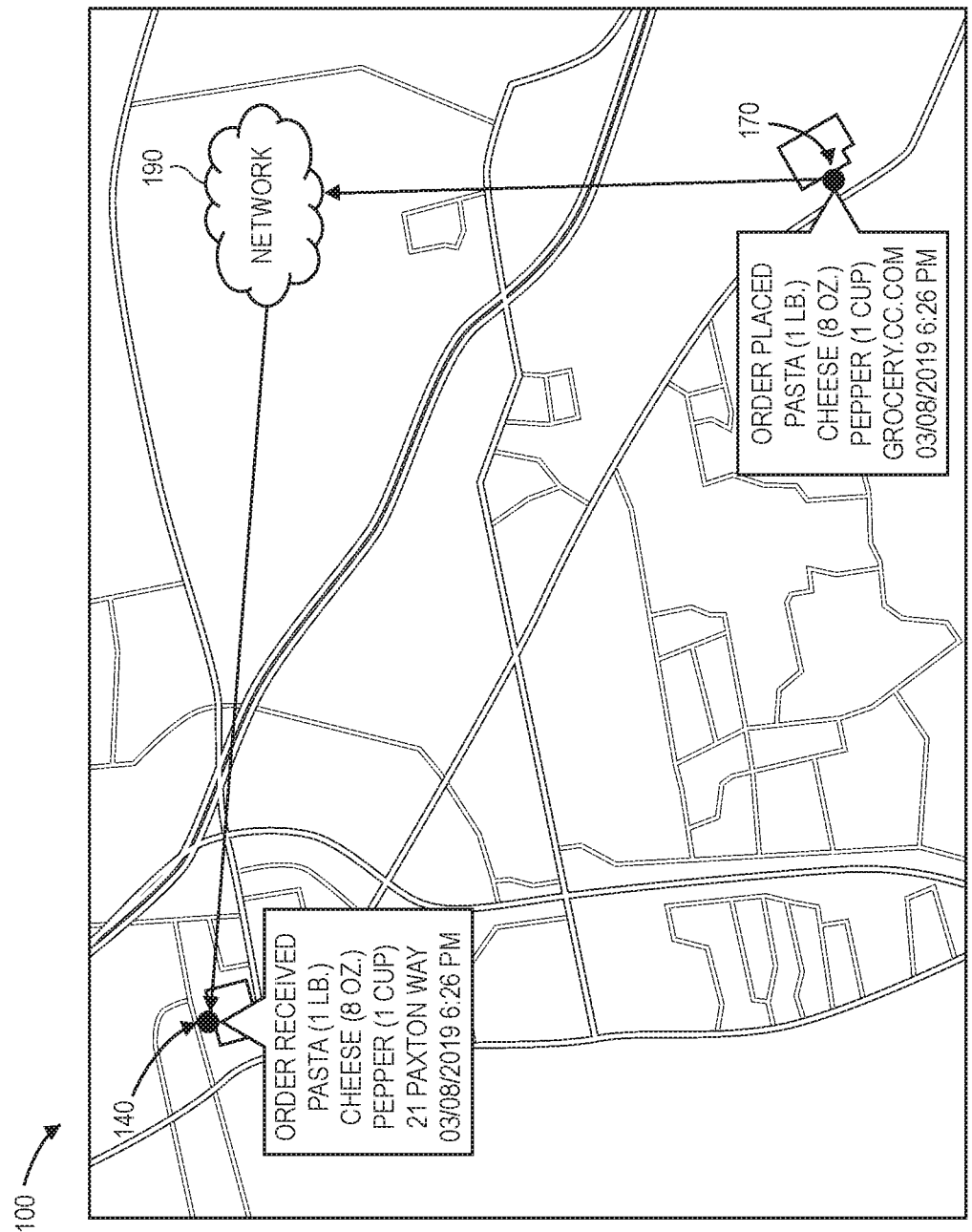

As is set forth in greater detail below, the present disclosure is directed to selecting flight routes based on historical exposure to flights of aerial vehicles at one or more ground-based locations. More specifically, one or more of the systems and methods of the present disclosure is directed to determining an extent to which one or more locations within a region (e.g., a neighborhood) has been subjected to "flight exposure," or flights of aerial vehicles over or near such locations within the region over time, and selecting a flight route for an aerial vehicle that takes into account the exposure at the locations within the region. For example, when preparing for the performance of a mission by an aerial vehicle, aspects of a route including not only courses, speeds, altitudes or orientations of the aerial vehicle, but also waypoints or paths through which the aerial vehicle will travel, and other operating characteristics (e.g., numbers or speeds of motors) of the aerial vehicle, may be selected based on an extent to which locations within the region have been subjected to flight exposure over time. Factors that may be considered in selecting a route include, but are not limited to numbers of flights over or near such locations, and times or dates at which such flights occurred, including a level of recency of one or more of such flights, as well as intensities (e.g., sound pressure levels) and frequency spectra of sounds radiated by aerial vehicles during such flights, and courses, speeds, altitudes or orientations of the aerial vehicles as such sounds were radiated.

In some embodiments, an optimal route for an aerial vehicle to or through a region, or one or more paths of the optimal route, may be selected for the performance of a mission based on historical flight activity of aerial vehicles experienced at locations within the region, along with any number of other factors. For example, an optimal route may be generated according to one or more traditional shortest path or shortest route algorithms such as Dijkstra's Algorithm, Bellman-Ford Algorithm, Floyd-Warshall Algorithm, Johnson's Algorithm or a hub labeling technique, and such algorithms may consider any attributes or features of an aerial vehicle, prevailing environmental conditions, or intensities or frequency spectra of sounds to which ground-based locations within a region have been subjected as one or more inputs.

In some embodiments, an optimal route for an aerial vehicle that has been selected by one or more of such algorithms based on traditional inputs, or in any other manner, may be modified to account for historical levels of flight exposure in locations along or near the optimal route. For example, one or more paths of the optimal route may be modified to avoid a location that has been frequently or recently subjected to flights of aerial vehicles, or to noises of various intensities or frequency spectra during missions of such aerial vehicles, or to include a location that has been infrequently or not recently subjected to flights or been exposed to such noises. In some embodiments, a model of the flight exposure within a region, e.g., with respect to two-dimensional ground-based features or three-dimensional space, may be generated and used to select one or more paths or routes of an aerial vehicle, or to cause the aerial vehicle to travel over or avoid one or more locations. The model may take the form of a map or other cartographic representation with respect to actual features (e.g., dwellings or other structures, or lots upon which such dwellings or structures rest) within a region, or arbitrarily defined sectors (e.g., a grid) within the region, and the model may be used to plan flight operations of an aerial vehicle. Furthermore, in some embodiments, a model of flight exposure within a region may also be derived by one or more machine learning systems, which may be trained to associate information or data regarding known topographical or surface features such as buildings (e.g., dwellings), ground surfaces, water surfaces or the like with information or data regarding prior operations of aerial vehicles, including but not limited to noises radiated from the aerial vehicles while traveling on one or more courses, speeds, altitudes or orientations and over various locations. A model of the extent of noise exposure in the region may be derived based on outputs received from the machine learning systems.

Referring to FIGS. 1A through 1F, a region 100 including a fulfillment center 140 and at least one dwelling 170 or other location of a customer is shown. The fulfillment center 140 may be any facility that is adapted to receive, store, process and/or distribute items, including but not limited to warehouses, distribution centers, cross-docking facilities, order fulfillment facilities, packaging facilities, shipping facilities, rental facilities, libraries, retail stores or establishments, wholesale stores, museums, or other facilities.

As is shown in FIG. 1A, an order for the delivery of items is placed by the customer at the dwelling 170, e.g., by way of one or more user interfaces displayed on a computer device such as a smartphone, tablet computer, laptop computer, or desktop computer, or via any other computer-based system including but not limited to a smart speaker, a home assistant, a television, a wrist watch, or any other device or system. Alternatively, the order may have been placed by telephone or in person, and the dwelling 170 may be designated as a place to which the items are to be delivered. As is shown in FIG. 1A, the order identifies a date and time at which the order was placed, and not only includes a request for one pound of pasta, eight ounces of cheese and one cup of pepper, but also designates an address or other geolocator associated with the dwelling 170 where the items are to be delivered.

Figure 1B:
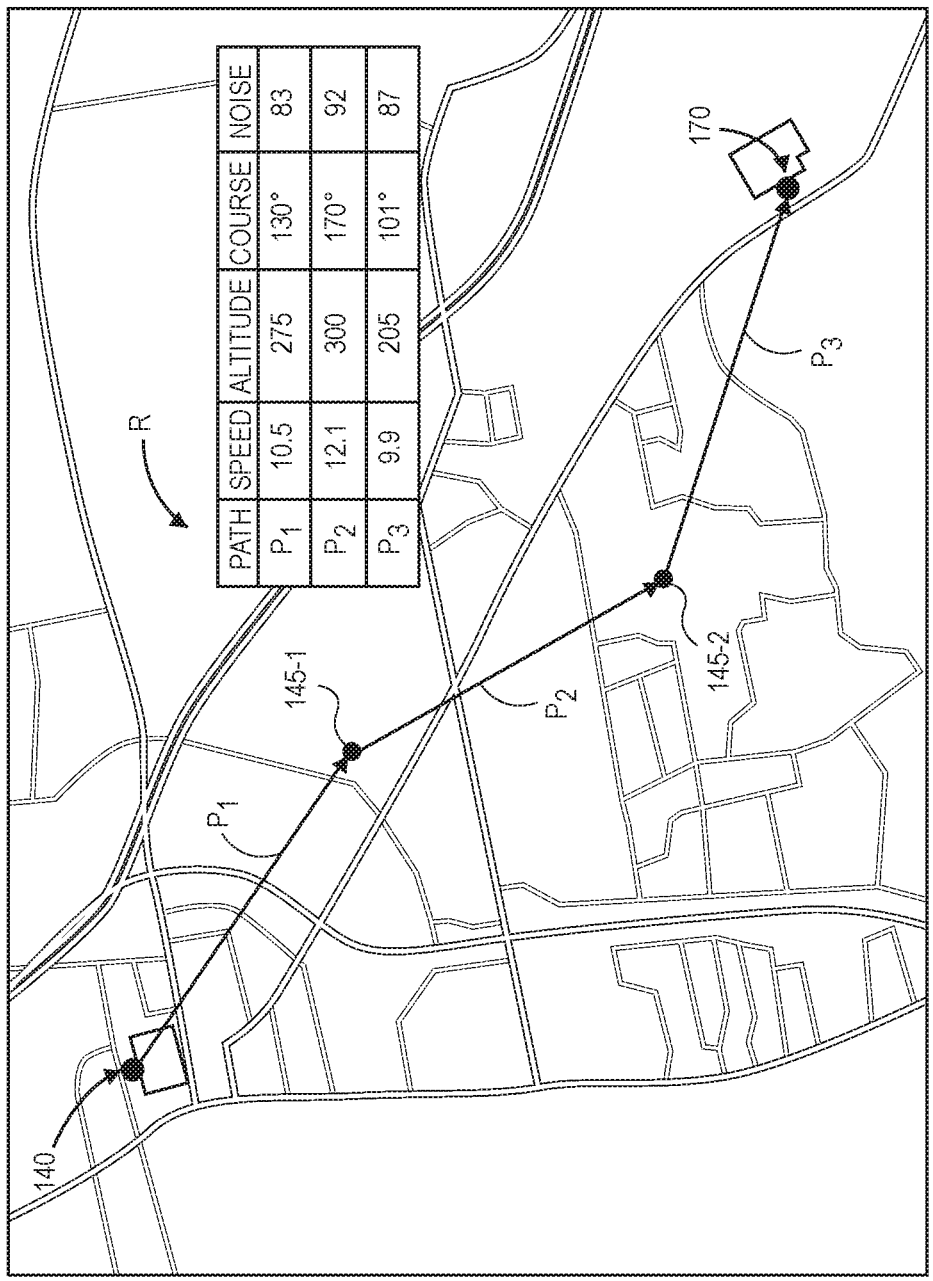

As is shown in FIG. 1B, after the order has been received by the fulfillment center 140, an optimal route R for delivering the items from the fulfillment center 140 to the dwelling 170 is generated. For example, one or more servers or other computer-based systems associated with the fulfillment center or elsewhere may execute one or more shortest path or shortest route algorithms to identify the route R, which includes a plurality of paths $P_1$, $P_2$, $P_3$ extending between the fulfillment center 140 and the dwelling 170. In some embodiments, the algorithms may include, but are not limited to, Dijkstra's Algorithm, Bellman-Ford Algorithm, Floyd-Warshall Algorithm, Johnson's Algorithm or a hub labeling technique.

For each of the paths $P_1$, $P_2$, $P_3$, a course, a speed, and an altitude may be selected. For example, as is shown in FIG. 1B, the path $P_1$ calls for an aerial vehicle to take off from the fulfillment center 140 and travel at a speed of 10.5 knots, at an altitude of 275 feet, and on a course of 130 degrees to an intervening waypoint 145-1. The path $P_2$ calls for the aerial vehicle to travel at a speed of 12.1 knots, at an altitude of 300 feet, and on a course of 170 degrees from the intervening waypoint 145-1 to another intervening waypoint 145-2, while the path $P_3$ calls for the aerial vehicle to travel at a speed of 9.9 knots, at an altitude of 205 feet and on a course of 101 degrees from the intervening waypoint 145-2 to the dwelling 170 or a location associated therewith. In some embodiments, a path may further be defined to include an orientation of the aerial vehicle 110, e.g., one or more of a yaw angle, a pitch angle or a roll angle for the aerial vehicle 110 while traveling along the path.

Additionally, for each of the paths $P_1$, $P_2$, $P_3$, a level of radiated noise may also be estimated. For example, as is shown in FIG. 1B, it is anticipated that an aerial vehicle will radiate sound at an intensity level of 83 decibels while traveling on the path $P_1$. Additionally, it is anticipated that the aerial vehicle will radiate sound at an intensity level of 92 decibels while traveling on the path $P_2$. It is further anticipated that the aerial vehicle will radiate sound at an intensity level of 87 decibels while traveling on the path $P_3$.

Figure 1C:
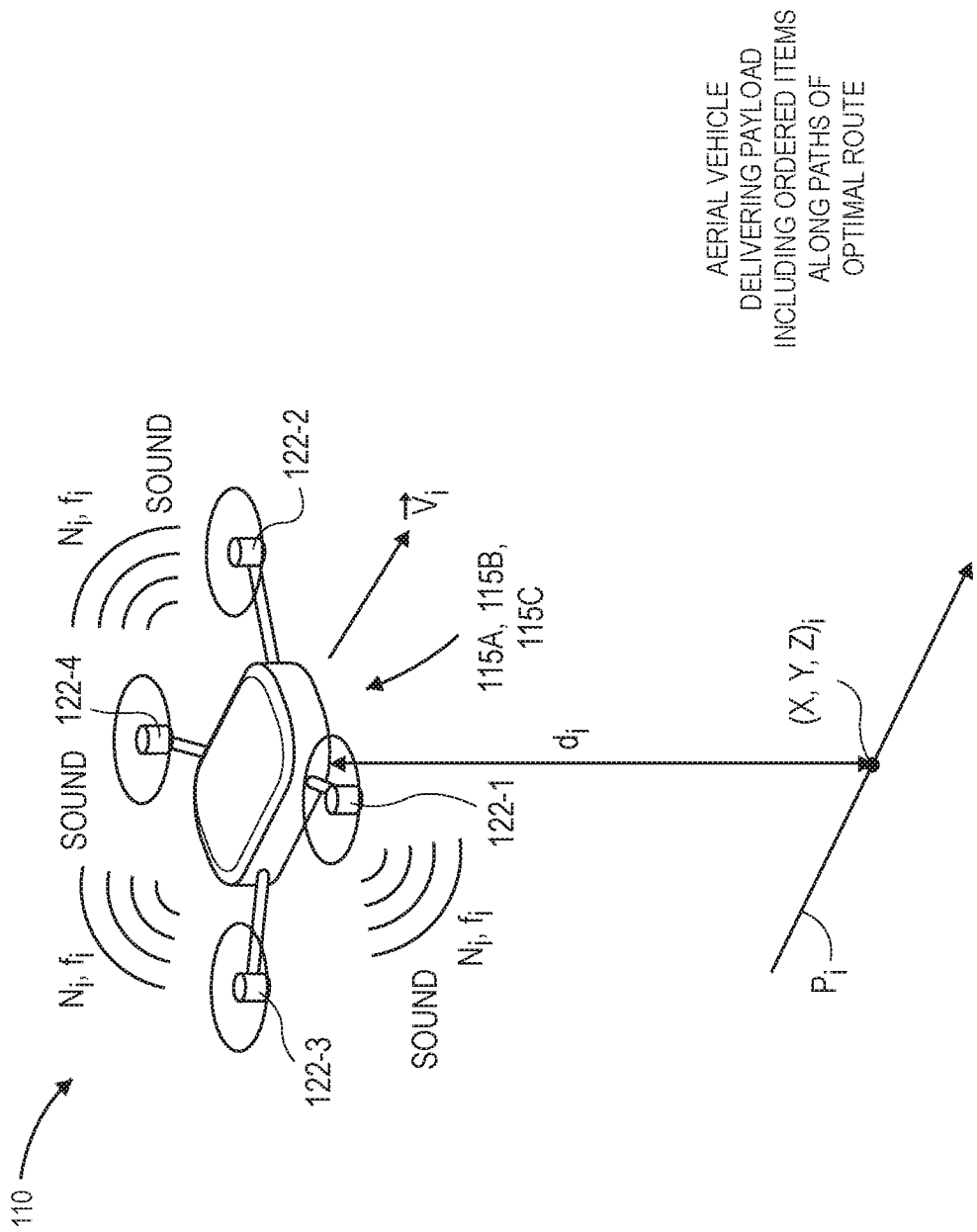

As is shown in FIG. 1C, an aerial vehicle 110 is shown as operating under power of four propulsion motors 122-1, 122-2, 122-3, 122-4, each of which is performing work on air surrounding the aerial vehicle 110 to generate forces of lift and/or thrust for the aerial vehicle 110, and to cause the aerial vehicle 110 to travel at a selected velocity (viz., course and speed) Vi while transporting items 115A, 115B, 115C included in the order along one of the paths $P_1$. The aerial vehicle 110 may also be outfitted with one or more altimeters, airspeed sensors, compasses, gyroscopes or other sensors (not shown) for determining an altitude $d_i$ or the velocity $V_i$ of the aerial vehicle 110. The aerial vehicle 110 may be further outfitted with one or more position sensors, e.g., Global Positioning System ("GPS") sensors, or cellular telephonic equipment (not shown), from which a position (x, y, z)$_i$ of the aerial vehicle 110 may be determined. Alternatively, a position sensor may also be used to determine an altitude and/or an airspeed or velocity of the aerial vehicle 110.

In some embodiments, an intensity $N_i$ or a frequency $f_i$ of sound radiating from the aerial vehicle 110 may be determined at various distances or ranges from the aerial vehicle 110 where information or data regarding power levels of one or more components or vibrations radiating from such components are known. Alternatively, in some embodiments, the aerial vehicle 110 may also be outfitted with one or more acoustic sensors (not shown) for capturing information or data regarding sounds radiating from the aerial vehicle 110 during operation of the aerial vehicle 110 and the one or more propulsion motors 122-1, 122-2, 122-3, 122-4. The information or data may identify intensities $N_i$ of the sounds radiating from the aerial vehicle 110, frequencies (or frequency spectra) $f_i$ of such sounds, at selected distances from the aerial vehicle 110, and may include information regarding the positions (x, y, z)$_i$ at which such intensities $N_i$ or frequencies $f_i$ were observed.

Figure 1D:
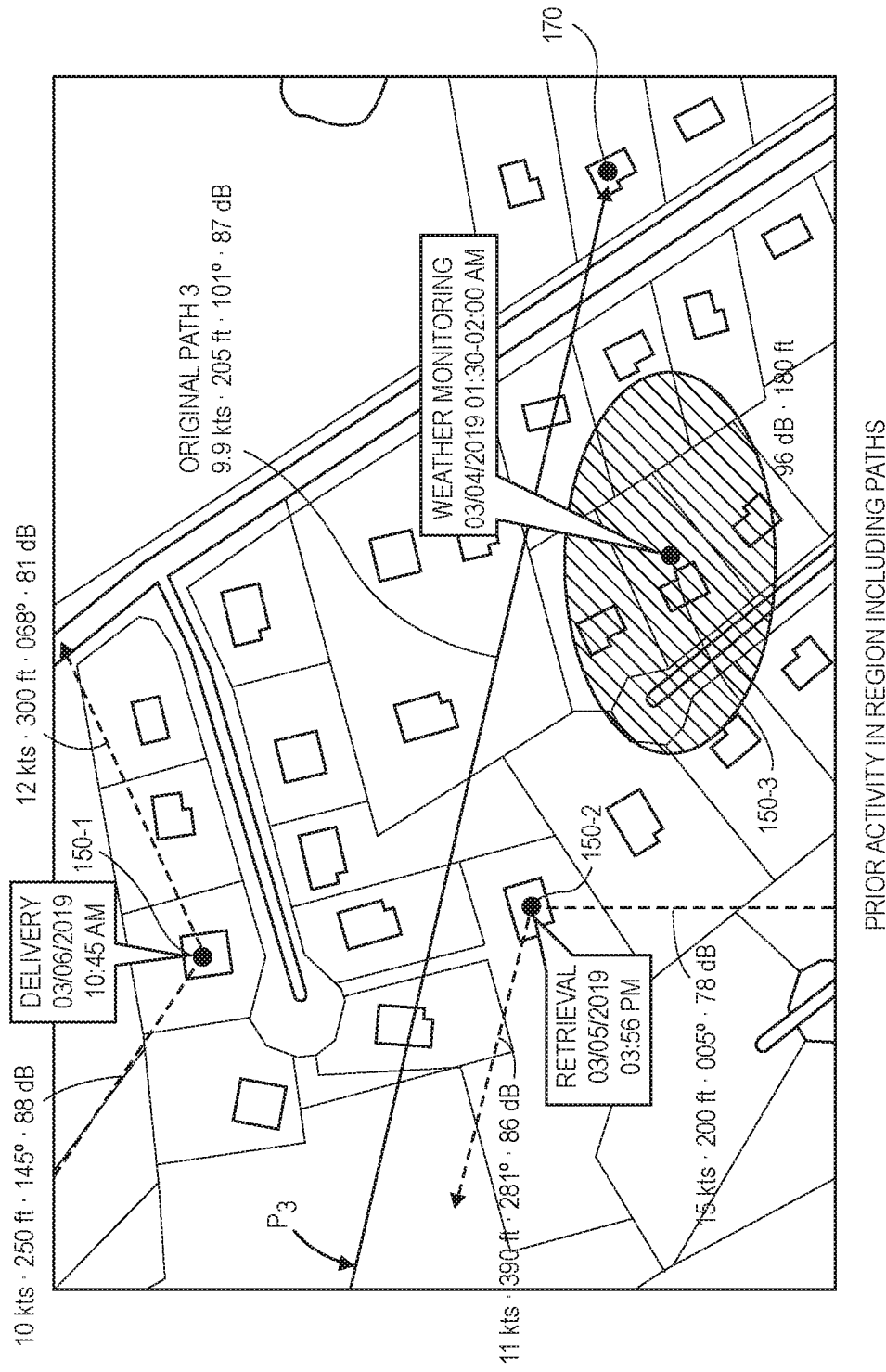

In accordance with embodiments of the present disclosure, a route of an aerial vehicle, such as the route R, may be selected or modified based on information or data that is known regarding prior flight exposure experienced at locations along or near the route. The information or data may be determined based on prior missions performed by aerial vehicles (e.g., deliveries) at or near such locations. As is shown in FIG. 1D, information or data regarding a number of prior missions that occurred within a vicinity of the path $P_3$ is shown. For example, as is shown in FIG. 1D, a delivery was recently completed by an aerial vehicle at a location 150-1 just north of the path $P_3$, with the aerial vehicle traveling at a speed of 10 knots, an altitude of 250 feet and a course of 145 degrees while radiating sound at an intensity level of 88 decibels prior to arriving at the location 150-1. After delivering the item, the aerial vehicle traveled at a speed of 12 knots, at an altitude of three hundred feet and on a course of 068 degrees while radiating sound at an intensity level of 81 decibels.

Similarly, an aerial vehicle also recently completed a retrieval at a location 150-2 south of the path $P_3$, with the aerial vehicle traveling at a speed of 15 knots, an altitude of 200 feet and a course of 005 degrees while radiating sound at an intensity level of 78 decibels prior to retrieving the item. After retrieving the item, the aerial vehicle traveled at a speed of 11 knots, at an altitude of 390 feet and on a course of 281 degrees, while radiating sound at an intensity level of 86 decibels. Likewise, an aerial vehicle also recently performed weather monitoring operations centered around a location 150-3 south of the path $P_3$, for half an hour, with the aerial vehicle traveling at an altitude of 180 feet and radiating sound at an intensity level of 96 decibels.

Figure 1E:
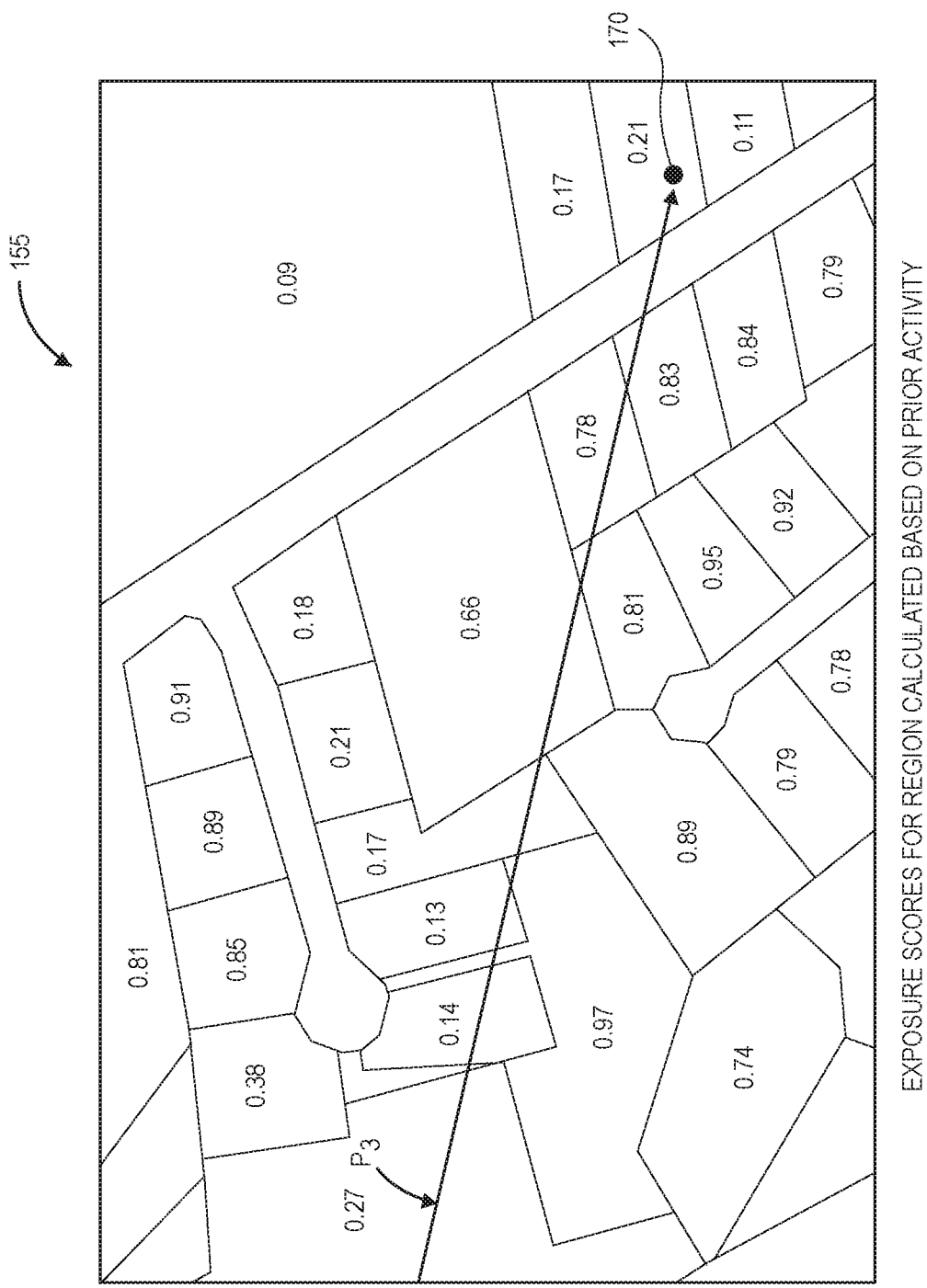

Based on the recent flight operations within a vicinity of the path $P_3$, as shown in FIG. 1D, and the sounds radiated during such flight operations, a model 155 of the flight exposure within the region 100 may be generated. As is shown in FIG. 1E, the model 155 includes exposure scores that are calculated for a plurality of parcels or other sectors within the region 100, based on the prior missions of aerial vehicles that occurred within a vicinity of the path $P_3$ as shown in FIG. 1D. The exposure scores shown in FIG. 1E are calculated for portions or sectors of the region 100 corresponding to individual parcels or properties, based on any factors or attributes regarding the prior missions. For example, such facts or attributes may include, but are not limited to, a total number of the prior missions that passed over or near such parcels or properties, a measure of the recency of such prior missions, or noises radiated by aerial vehicles during such prior missions, or any other factors or attributes. The exposure scores may have any absolute or relative value, or range of values, and may be integers, decimals or fractions, or any other numbers.

In accordance with embodiments of the present disclosure, all or a portion of the route R may be modified to avoid locations that were subjected to flight exposure, or to include locations that were not subjected to flight exposure. As is shown in FIG. 1F, the path $P_3$ may be modified to include a path $P_{3A}$ and a path $P_{3B}$. The path $P_{3A}$ calls for the aerial vehicle 110 to turn away from the path $P_3$ at a waypoint 145-3, and to travel toward a waypoint 145-4 at a speed of 15 knots, at an altitude of 395 feet, and on a course of 078 degrees. It is anticipated that the aerial vehicle 110 will radiate sound having an intensity level of 100 decibels while traveling along the path $P_{3A}$. Meanwhile, the path $P_{3B}$ calls for the aerial vehicle to travel from the waypoint 145-4 to the dwelling 170 at a speed of 12.5 knots, at an altitude of 300 feet, and on a course of 158 degrees. It is anticipated that the aerial vehicle 110 will radiate sound having an intensity level of 88 decibels while traveling along the $P_{3B}$.

Accordingly, the systems and methods of the present disclosure are directed to selecting flight routes based on historical flight exposure at one or more ground-based locations. Where one or more locations in a region have been subjected to overhead flight operations of any kind or duration, information or data regarding positions or operating characteristics of aerial vehicles, prevailing environmental conditions during such missions, or noises radiated from the aerial vehicles during such missions, may be determined and used to generate a model of flight exposure of the region. Such models may depict or represent information or data regarding the flight exposure, including but not limited to numbers of flights overhead or nearby over a period of time, as well as one or more measures of the recency of such flights, or sounds radiated from aerial vehicles during such flights, or any other information or data. Such models may be cumulative in nature, such that flight operations occurring over or near a location cause an exposure score for that location to increase nominally or as a function of one or more aspects of the flight operations, including but not limited to intensities (e.g., sound pressure levels) or frequency spectra of sounds radiated from aerial vehicles during the flight operations. Alternatively, in some embodiments, such models may be configured or programmed to degrade or otherwise diminish exposure scores over time, such as according to one or more decay functions (e.g., exponential decay functions), effectively weighting more recent exposures more heavily than less recent exposures.

In some embodiments, a model may depict an extent of exposure to sound radiating from aerial vehicles during flight operations over or near one or more locations in a region. Sound is generated when motion or vibration of an object (e.g., an aerial vehicle) results in a pressure change in a medium, such as air, surrounding the object. For example, when such motion or vibration occurs, the densities of the molecules of the medium within a vicinity of the object are subjected to alternating periods of condensation and rarefaction, resulting in contractions and expansions of such molecules, which causes the issuance of a sound wave that may travel at speeds of approximately three hundred forty-three meters per second (343 m/s) in dry air. The intensity of sounds is commonly determined as a sound pressure level (or sound level), and is measured in logarithmic units called decibels (dB).

In industrial applications, noise is typically generated as either mechanical noise, fluid noise or electromagnetic noise. Mechanical noise typically results when a solid vibrating surface, e.g., a driven surface, or a surface in contact with one or more linkages or prime movers, emits sound power that is a function of a density of a medium, the speed of sound within the medium, the vibrating area, the mean square vibrating velocity of the medium to a vibrating area and a mean square vibrating velocity, and the radiation efficiency of the material. Fluid noise generated by turbulent flow is generally proportional to multiple orders of flow velocity, e.g., six to eight powers greater than the velocity of the turbulent flow, while sound power generated by rotating fans is determined according to a function of flow rate and static pressure. In electric motors, noise may be generated due to airflow at inlets and outlets of cooling fans, bearing or casing vibrations, motor balancing shaft misalignment or improper motor mountings.

With regard to a frequency spectrum, radiated sounds generally fall into one of two categories. Sounds having energies that are typically concentrated or centered around discrete frequencies are classified as narrowband noise, or narrowband tonals, and are commonly periodic in nature. Narrowband noise is commonly encountered in many industrial applications. For example, many rotating machines such as internal combustion engines, compressors, vacuum pumps or other rotating machines may inherently vibrate at frequencies associated with their angular velocities, as well as electric power transformers that generate large magnetic fields and thereby vibrate at harmonics of line frequencies. Conversely, sounds having energies that are distributed across bands of frequencies are classified as broadband noise. Additionally, some machines or sound sources may emit sounds that are combinations of narrowband noise and broadband noise, e.g., sounds that have component energy levels that are concentrated about one or more discrete frequencies and also across entire frequency spectra.

By selecting a route or path for flight operations based on a model of sounds radiated during prior flight operations, one or more embodiments of the present disclosure may effectively reduce psychoacoustic effects of radiated noise to humans or other animals, including but not limited to how such humans or animals hear such sounds, or psychologically respond to such sounds, and the impacts of such sounds on their respective nervous systems.

The systems and methods of the present disclosure are not limited to selecting flight routes based on exposure to radiated sounds at one or more ground-based locations, however. For example, in some embodiments, flight operations over or near one or more locations may be tracked without regard to sounds radiated by aerial vehicles during such operations. Because repeated flight operations over a given location may leave humans with a sense of a lack of privacy or a perceived risk of damage to property, flight routes may be selected to avoid repeated flight operations over the location, to a maximum extent practicable.

Moreover, a flight route may be selected based on a measure of cost that considers how often or recently flight operations have occurred over or near one or more locations. For example, where a mission is particularly time-critical or urgent, the mission may be performed by an aerial vehicle along an optimal route or path without regard to a number or recency of flight operations (or sounds radiated during such operations) below or near the optimal route or path. Where a mission is not particularly time-critical or urgent, however, or where surplus energy is available, the mission may be performed along a route or path that has been selected based on the number or recency of flight operations below or near the optimal route or path (or sounds radiated during such operations), or on any other basis.

Figure 2:
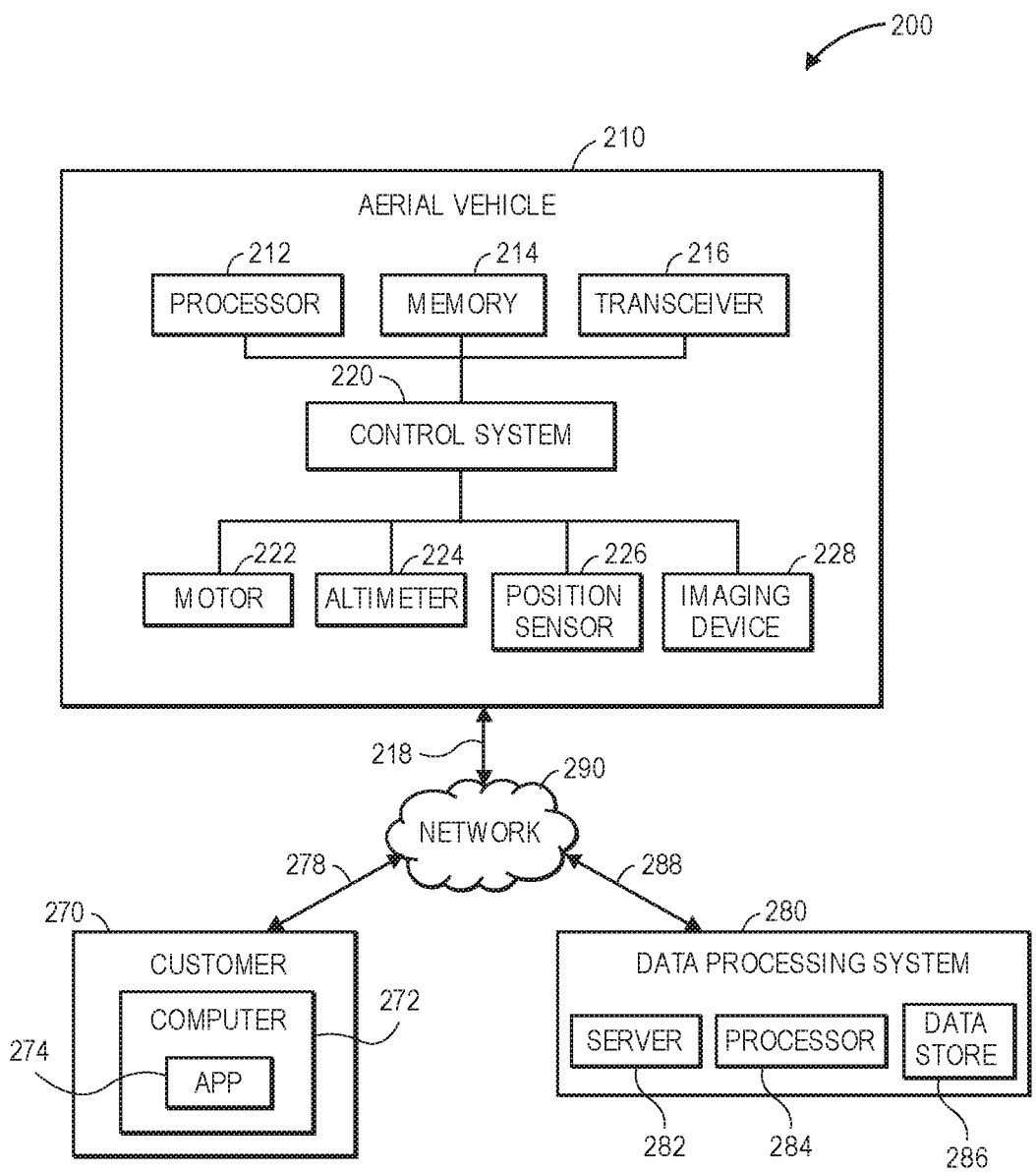
FIG. 2 is a block diagram of one system for selecting flight routes based on historical exposure in accordance with embodiments of the present disclosure.

Referring to FIG. 2, a block diagram of one system 200 for selecting flight routes based on historical exposure in accordance with embodiments of the present disclosure is shown. The system 200 of FIG. 2 includes an aerial vehicle 210, a customer 270 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1F.

As is shown in FIG. 2, the aerial vehicle 210 includes a processor 212, a memory 214 and a transceiver 216. The aerial vehicle 210 further includes a control system 220, a plurality of propulsion motors 222, an altimeter 224, a position sensor 226 and an imaging device 228.

The processor 212 may be configured to perform any type or form of computing function associated with the operation of the aerial vehicle 210, including but not limited to the execution of one or more machine learning algorithms or techniques. The processor 212 may also be configured to execute any other algorithms or techniques (e.g., object detection or recognition algorithms or techniques) associated with one or more applications, purposes or functions, e.g., to select at least one of a course, a speed, an altitude or an orientation (e.g., one or more of a yaw angle, a pitch angle or a roll angle) for the safe operation of the aerial vehicle 210. For example, the processor 212 may be configured to control any aspects of the operation of the aerial vehicle 210 and the one or more computer-based components thereon, including but not limited to the propulsion motors 222, the altimeter 224, the position sensor 226 and/or the imaging device 228. The processor 212 may control the operation of one or more control systems or modules, such as the control system 220, for generating instructions for conducting operations of one or more of the propulsion motors 222, the altimeter 224, the position sensor 226 and/or the imaging device 228, or for interpreting information or data captured using one or more other sensors. Such control systems or modules may be associated with one or more other computing devices or machines, and may communicate with the data processing system 280 or one or more other computer devices or aerial vehicles (not shown) over the network 290, as indicated by line 218, by the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. For example, the memory 214 may be configured to store one or more locations where sound is radiated at specific intensities and/or within specific frequency spectra, as well as any relevant information including but not limited to courses, speeds, altitudes or orientations of the aerial vehicle 210 at such locations, or one or more operating characteristics (e.g., numbers of propulsion motors 222 that are operating and at which speeds, numbers of control surfaces that are operated and at which angles or distances), environmental conditions (e.g., weather projections, ground conditions, cloud coverage, sunshine or other information or data regarding the environment at the origin and the destination, or between the origin and the destination), imaging data or any other information or data. The memory 214 may be configured to store executable instructions, imaging data, flight routes or paths, flight control parameters, sound intensities or frequency spectra and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight routes or paths, flight control parameters, sound intensities or frequency spectra and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 overtime. In some other embodiments, the aerial vehicle 210 may include one or more devices, components, systems, or instruments for determining a speed or velocity of the aerial vehicle 210, and may include related components (not shown) such as pitot tubes, accelerometers, or other features. For example, alternatively, or additionally, the aerial vehicle 210 may include one or more other devices, components, systems or instruments for determining information or data regarding the operation of the aerial vehicle, including but not limited to one or more airspeed sensors (e.g., any type or form of anemometer or other system for determining a speed of air flow within a vicinity of the aerial vehicle 210), which may include one or more pitot tubes, ultrasonic transceivers (e.g., transmitters and/or receivers) or other devices, components, systems or instruments, which may operate independently or in conjunction with one another. The aerial vehicle 210 may also include one or more other devices, components, systems or instruments for determining an altitude of the aerial vehicle 210, e.g., an altimeter 224 or other device, component, system, or instrument having any number of barometers, transmitters, receivers, range finders (e.g., laser or radar), imaging devices or other features for determining altitudes above ground.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more acoustic sensors or other devices, components, systems or instruments for capturing and/or interpreting acoustic energy, including but not limited to one or more microphones (e.g., a transducer such as a dynamic microphone, a condenser microphone, a ribbon microphone or a crystal microphone) that are configured to convert acoustic energy of any intensity and across any or all frequencies into one or more electrical signals. Such acoustic sensors may be mounted to or distributed throughout an airframe or other structure of the aerial vehicle 210 and may include any number of diaphragms, magnets, coils, plates, or other like features for detecting and recording such energy, piezoelectric sensors (e.g., sensors configured to convert changes in pressure to electrical signals, including one or more crystals, electrodes or other features), or vibration sensors. The aerial vehicle 210 may further include one or more compasses, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or other sensors.

The customer 270 may be any entity or individual that wishes to download, purchase, rent, lease, borrow or otherwise obtain items (which may include goods, products, services or information of any type or form) from any source, e.g., for delivery by one or more of the aerial vehicles 210. The customer 270 may utilize one or more computers 272 (e.g., a smartphone, a tablet computer, a laptop computer, a desktop computer, or computing devices provided in wristwatches, televisions, set-top boxes, smart speakers, automobiles or any other appliances or machines), or any other like machine, that may operate or access one or more software applications 274, such as a web browser or a shopping application, and may be connected to or otherwise communicate with the aerial vehicle 210, the data processing system 280, or one or more other computer systems through the network 290, as indicated by line 278, by the transmission and receipt of digital data.

Although the block diagram of FIG. 2 includes a single box for an aerial vehicle 210, a single box for a propulsion motor 222, a single box for an altimeter 224, a single box for a position sensor 226, a single box for an imaging device 228, and a single box for a customer 270, those of ordinary skill in the pertinent arts will recognize that the system 200 may include any number or type of aerial vehicles, propulsion motors, altimeters, position sensors, imaging devices or other sensors, or customers, in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to sounds that are actually radiated by the aerial vehicle 210, or sounds that are expected to be radiated by the aerial vehicle 210, along with times or positions of the aerial vehicle 210 at which such sounds are radiated or predicted to have been radiated, or imaging data captured using the imaging device 228, and generating one or more optimal paths or routes based on such information or date. Alternatively, the data processing system 280 may be provided in connection with one or more physical or virtual services that are configured to receive, analyze or store such information or data, or other information or data, as well as one or more other functions. The data processing system 280 may be associated with one or more electronic marketplaces (e.g., online marketplaces), physical (e.g., bricks-and-mortar) marketplaces, fulfillment centers, materials handling facilities, warehouses, distribution centers, cross-docking facilities, order fulfillment facilities, packaging facilities, shipping facilities, rental facilities, libraries, retail stores or establishments, wholesale stores, museums, or other facilities. Alternatively, the data processing system 280 may be provided separate and apart (e.g., independent) any such facilities.

The servers 282 may be connected to or otherwise communicate with the processors 284 and the data stores 286, which may store any type of information or data, including but not limited to information or data regarding positions or times at which sounds of any intensity or frequency spectra are radiated by one or more aerial vehicles (including but not limited to the aerial vehicle 210), or positions or times at which such sounds are predicted to be radiated by such aerial vehicles, as well as courses, speeds, altitudes, orientations, operating characteristics of such aerial vehicles when radiating such sounds, or prevailing environmental conditions when such sounds are radiated or predicted to be radiated. The servers 282 may be configured to execute one or more algorithms to generate routes or paths to be traveled by aerial vehicles, e.g., one or more shortest route or shortest path algorithms, or to generate modifications to such routes or paths.

In some embodiments, the servers 282 may be configured to generate models in the form of two-dimensional or three-dimensional representations of flight exposure at a plurality of locations over time, or to modify such representations over time, or in response to variations in operating characteristics or environmental conditions. Furthermore, in some embodiments, the servers 282 may be configured to calculate amounts of energy to be expended by aerial vehicles (including but not limited to the aerial vehicle 210) during the performance of one or more missions along a route or path, or to calculate changes in such amounts of energy that may be expended or predicted to be expended where one or more variations to a path or route are executed. The servers 282 may be further configured to generate two-dimensional or three-dimensional representations of noise exposure or energy in the form of maps or other cartographic representations, for any purpose.

The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to execute one or more calculations regarding routes or paths to be traveled by the aerial vehicle 210, exposure to noise or energy levels that are to be expended by the aerial vehicle 210 at any time, e.g., based on courses, speeds, altitudes or orientations of the aerial vehicle 210 and/or operating characteristics of the aerial vehicle 210, or conditions of an environment in which the aerial vehicle 210 is operating. In some embodiments, the processor 212, the servers 282 and/or the processors 284 may be configured to generate two-dimensional or three-dimensional models or other representations of locations at or near where aerial vehicles have traveled, or sounds radiated from the aerial vehicles, e.g., by the aerial vehicle 210 or by one or more other aerial vehicles. In some embodiments, the processor 212, the servers 282 and/or the processors 284 may be configured to determine an optimal path or route between two locations for the execution of a given mission or task by the aerial vehicle 210 or one or more other aerial vehicles (not shown), such as according to one or more traditional shortest path or shortest route algorithms such as Dijkstra's Algorithm, Bellman-Ford Algorithm, Floyd-Warshall Algorithm, Johnson's Algorithm or a hub labeling technique. The processor 212, the servers 282 and/or the processors 284 may determine an optimal path or route based on any factor or element, including but not limited to times required to travel on any paths of an optimal route, any costs associated with traveling on the paths, any energy to be expended by travel on the paths, or any changes in energy resulting from changes in one or more of such paths, or from a model (e.g., a map or other cartographic representation) of flight exposure or noise, or any other intrinsic or extrinsic factors.

In some embodiments, the processor 212 and/or the server 282 may be configured to execute one or more machine learning systems or techniques. For example, in some embodiments, an artificial neural network or other machine learning system or technique may be trained to receive inputs in the form of information or data regarding flight exposure at locations within one or more regions, and to generate paths or routes, or modifications to paths or routes, based on outputs generated in response to such inputs. In some embodiments, the inputs may include, but are not limited to, not only intensities or frequency spectra of sounds radiated by aerial vehicles (including but not limited to the aerial vehicle 210), as well as locations at which such sounds are radiated, along with courses, speeds, altitudes, orientations, operating characteristics or environmental conditions at such locations. In some other embodiments, the inputs may further include information or data regarding surface features, topography, or terrain features at the one or more locations. In accordance with the present disclosure, an artificial neural network or other machine learning system may be trained in a supervised or unsupervised manner, and may include any number of neurons in any number of layers, including an input layer, an output layer, and one or more intervening hidden layers. Each of the neurons in a layer within a neural network may receive an input and generate an output in accordance with an activation function, with parameters corresponding to the various strengths or synaptic weights, e.g., in the form of a sigmoid function, wherein an output thereof may have a range of zero to one or 0 to 1, a hyperbolic tangent function, wherein an output thereof may have a range of negative one to positive one, or −1 to +1, or any others. A machine learning system, such as an artificial neural network, may be further trained using any information, data or metadata in accordance with embodiments of the present disclosure.

The aerial vehicle 210 and/or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210, the computer 272 or the data processing system 280 may operate or be operated by any of a number of computing devices that are capable of communicating over the network, including but not limited to set-top boxes, mobile devices, laptop computers, desktop computers, smart speakers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the functions described herein as being performed or executed by one or more of the processor 212, the memory 214, or the control system 220 of the aerial vehicle 210 may be performed or executed by one or more of the server 282, the processor 284 or the data store 286, or vice versa, e.g., by the sending and receiving of digital data over the network 290.

Figure 3:
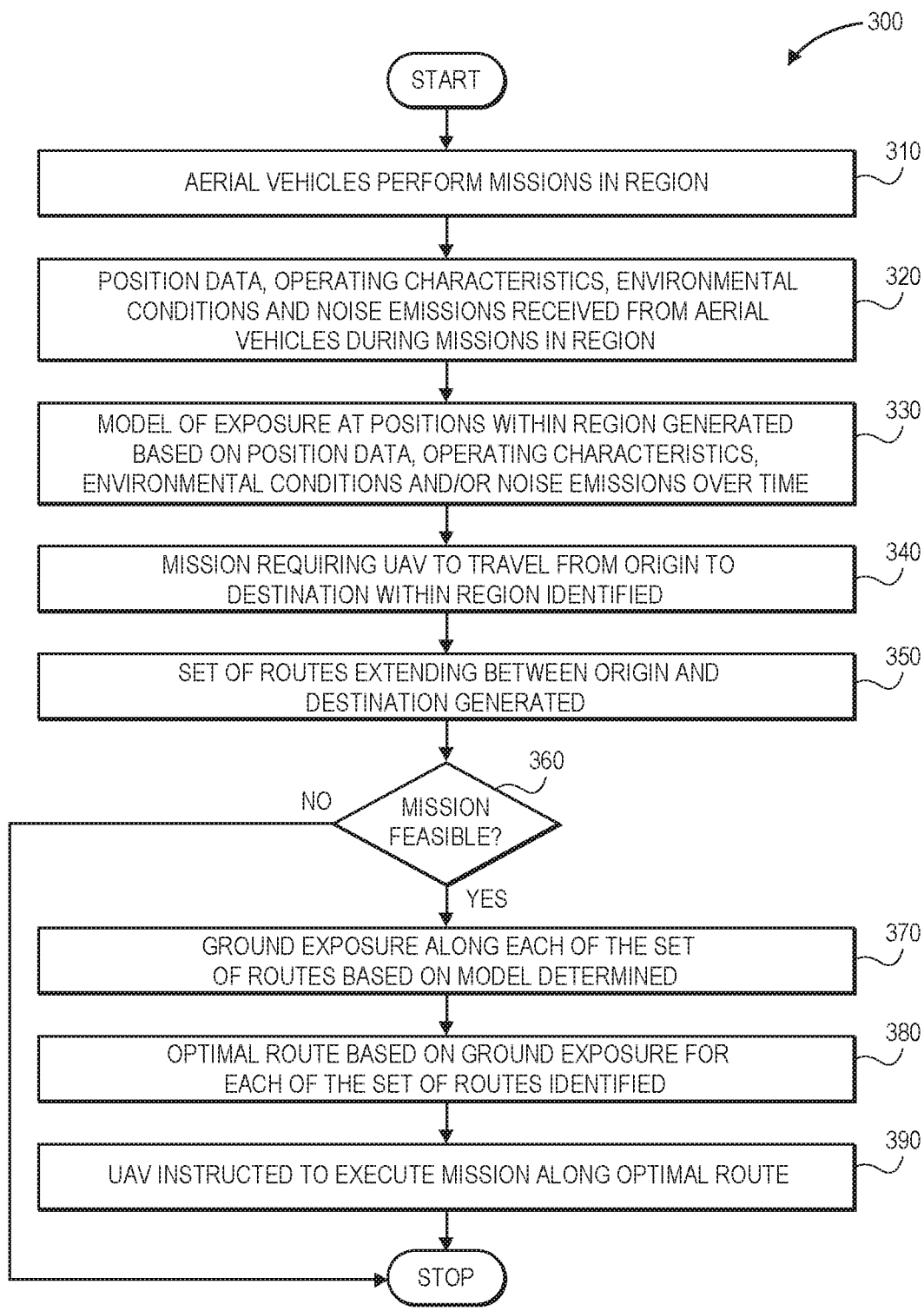
FIG. 3 is a flow chart of one process for selecting flight routes based on historical exposure in accordance with embodiments of the present disclosure.

As is discussed above, models of flight exposure at locations within a region may be generated based on information or data regarding prior flight operations over or near such locations, and the models may be utilized in selecting one or more routes or paths for travel by aerial vehicles during missions or other flight operations thereafter. Referring to FIG. 3, a flow chart 300 of one process for selecting flight routes based on historical exposure in accordance with embodiments of the present disclosure is shown. At box 310, a plurality of aerial vehicles perform missions within a region. The missions may be any type or form of mission that may be performed by the aerial vehicles, which may be of a common class or have common attributes or characteristics (e.g., the same number or type of propulsion motors or control surfaces, sizes, shapes, dimensions or payloads), or different attributes or characteristics. The missions may be the same or similar in nature, e.g., deliveries, monitoring operations, or responding to issues affecting safety, or different in nature, and may involve travel on the same courses, at the same speeds, at the same altitudes, or in the same orientations (e.g., yaw angles, pitch angles or roll angles), or at different courses, speeds, altitudes or orientations. Further, the missions may require travel to, from or over the same locations (e.g., origins, destinations or intervening waypoints, or to, from or over different locations. Moreover, the aerial vehicles may be manned or unmanned.

At box 320, position data, operating characteristics, environmental conditions and noise emissions from the aerial vehicles during the performance of the missions in the region is received. Such information or data may be received in real time or in near-real time, and synchronously or asynchronously, e.g., in one or more batch processes. For example, some or all of the information or data may be received from the aerial vehicles during the performance of the missions, or after the missions have been completed. Alternatively, some or all of the information or data may be received from other computer devices or systems.

At box 330, a model of flight exposure at locations within the region is generated based at least in part on the position data, operating characteristics, environmental conditions and/or noise emissions received from the aerial vehicles at box 320. For example, the model may take the form of a two-dimensional or a three-dimensional representation (e.g., a map) of the region indicating an extent to which aspects of the region have been subjected to flight exposure, or noise. The model may take into account exposure to flights at ground-level positions within the region, as well as distances between the aerial vehicles and the ground-level positions during flight operations. In some embodiments, the model may further consider information or data such as times or dates on which the exposure occurred, e.g., by weighting weekend or nighttime exposure more heavily than weekday or daytime exposure. In some embodiments, the model may further consider information or data such as intensities or frequency spectra of sounds radiated by the aerial vehicles during the flight exposure, e.g., by weighting exposure to noise at high intensities or within specific frequency spectra more heavily than exposure to noise at low intensities or within other frequency spectra. Moreover, in some embodiments, the model may be configured to accumulate flight exposure at ground-level positions, and to track the flight exposure in the aggregate over time. In some other embodiments, however, the model may be configured or programmed to degrade or otherwise diminish flight exposure over time, such as according to one or more decay functions (e.g., exponential decay functions), effectively weighting more recent flight exposure more heavily than less recent flight exposure. Furthermore, in some embodiments, a model may be augmented based on additional information or data regarding flight exposure within a region, e.g., due to subsequent flight operations within or over the region. The model may be generated in any manner, such as by one or more machine learning tools or techniques. For example, some or all of the position data, operating characteristics, environmental conditions and noise emissions received from the aerial vehicles at box 320 may be provided to a machine learning tool, system or technique as inputs, and the model may be generated based on outputs received in response to such inputs.

At box 340, information or data regarding a mission requiring an aerial vehicle to travel from an origin to a destination within the region is received. The mission may be of any type or form, including but not limited to a delivery to a location within the region, a monitoring operation occurring within the region, or a response to an issue affecting public or private safety within the region, or of two or more types or forms, and may be defined subject to any number of constraints or requirements. Moreover, the origin may occur entirely within the same region as the destination, or in a different region. In some embodiments, the information or data may be received by a server or other computer device or system (e.g., a data processing system) associated with a fulfillment center, a materials handling facility, a retail establishment of any type or form, or any other facility. Alternatively, the information or data may be received by one or more processors aboard an aerial vehicle, which may be configured to perform or execute one or more of the functions described herein.

At box 350, a set of routes extending between the origin and the destination is generated. The set of routes may be generated in any manner, such as according to one or more shortest route or shortest path algorithms, or any other algorithms, that take into account any attributes of the mission or of an aerial vehicle that is to perform the mission. For example, a route may include one or more paths on which the aerial vehicle is to travel, may be specified with respect to a course, a speed, an altitude, or any other factors or requirements, and the route or one or more of such paths may be selected with respect to any ground features or airspace restrictions. The route may further identify one or more positions of the origin, the destination or any intervening waypoints. The set of routes generated at box 350 may include any number of routes (e.g., one or more), and each of such routes may include any number of paths (e.g., a single path between the origin and the destination, or multiple paths from the origin to the destination by way of any number of intervening waypoints).

At box 360, whether the mission is feasible is determined based on the set of routes generated at box 350. For example, a mass of a payload, one or more airspace restrictions, any prevailing environmental conditions, or the availability of aerial vehicles within the region may be considered in making a feasibility determination with respect to such routes. If the mission is not feasible, then the process ends, and the mission may be canceled (e.g., scrubbed), scheduled for another time or day, or performed in another manner, such as by a vehicle other than an aerial vehicle.

If the mission is determined to be feasible, however, then the process advances to box 370, where historical ground exposure to flight operations along each of the set of routes is determined based on the model. For example, the model may indicate the extent to which aerial vehicles have traveled over or near locations along or below one or more paths of a route, including recent exposures, or exposures over a selected period of time. In some embodiments, attributes of sounds radiated from the aerial vehicles while traveling over or near such locations may be determined.

At box 380, an optimal route is selected based on the historical ground exposures along each of the set of routes, as determined at box 370. For example, in some embodiments, the optimal route may be determined based on an optimal minimization cost function that selects a specific one of the set of routes generated at box 350 with a goal of minimizing noise exposure while performing the mission, subject to any number of constraints or requirements. At box 390, the aerial vehicle is instructed to execute the mission along the optimal route identified at box 380, and the process ends.

As is discussed above, models in the form of two-dimensional or three-dimensional representations of a region that indicate an extent to which aspects of the region have been subjected to flight operations may be generated and used to select one or more routes or paths for aerial vehicles in the future. Referring to FIGS. 4A through 4D, views of aspects of systems for selecting flight routes based on historical exposure in accordance with embodiments of the present disclosure are shown. Except where otherwise noted, reference numerals preceded by the number "4" shown in FIGS. 4A through 4D indicate components or features that are similar to components or features having reference numerals preceded by the number "2" shown in FIG. 2 or by the number "1" shown in FIGS. 1A through 1F.

As is shown in FIG. 4A, an aerial vehicle 410 performs a mission such as a delivery, a monitoring operation, or a response to an issue affecting safety while traveling over a region 400 along a route having one or more paths. The region 400 may include locations having one or more dwellings or other structures, including but not limited to elements of transportation infrastructure, as well as locations lacking any dwellings or structures.

Figure 4B:
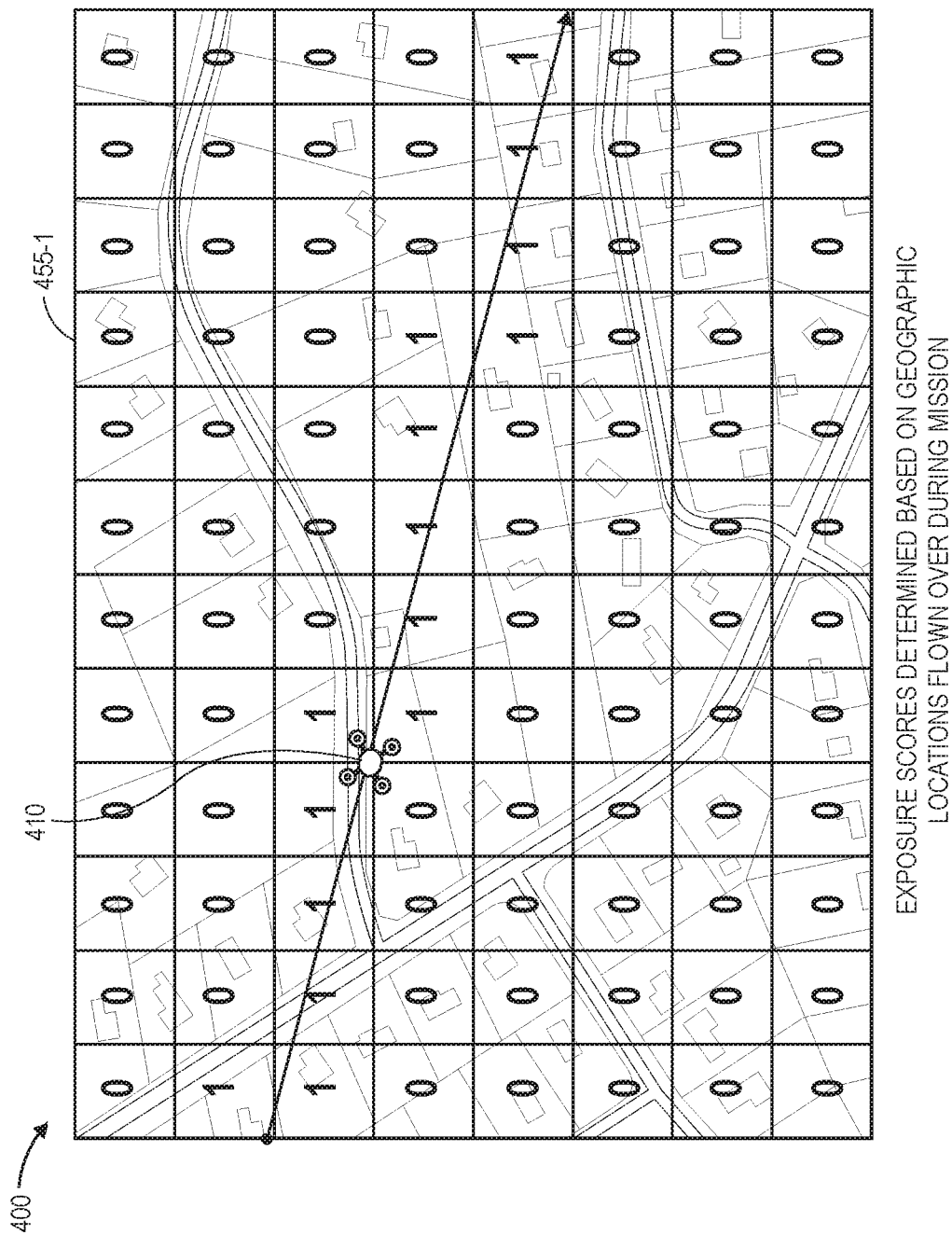

In some embodiments, a model of flight exposure over a region may be defined by two-dimensional or three-dimensional representations of locations within the region, and may indicate exposure scores calculated based on flight exposure at such locations. Such models may depict the flight exposure at regularly defined or irregularly defined locations within the region. As is shown in FIG. 4B, a model 455-1 of the region 400 depicts exposure scores that are determined based on geographic locations flown over during the performance of the mission by the aerial vehicle 410. For example, as is shown in FIG. 4B, the model 455-1 is in the form of a grid having portions or sectors of the region 400 that are regularly sized and shaped. The model 455-1 indicates exposure scores of 1 for portions or sectors of the region 400 that lie below or near the route traveled by the aerial vehicle 410, and exposure scores of 0 for portions or sectors of the region 400 that do not lie below the route. Thus, the exposure scores for locations within the region 400 that are depicted within the model 455-1 may be incrementally increased for each flight operation that passes over such portions or sectors. In some embodiments, exposure scores for portions or sectors of the region 400 that are adjacent to or near portions or sectors over which the aerial vehicle 410 traveled may also be selected based on the flight of the aerial vehicle 410, such as by assigning an exposure score of 1 to such portions or sectors, or an exposure score having a value less than one, e.g., based on a range or distance between such portions or sectors and the route of the aerial vehicle 410. In some other embodiments, the exposure scores within the portions or sectors of the region 400 shown in FIG. 4B may be permitted to degrade over time, e.g., according to one or more decay functions, to reflect the recency with such portions or sectors have been subjected to flight exposure. Once the model 455-1 has been generated, one or more routes or paths for aerial vehicles may be selected based at least in part on the model 455-1.

Figure 4C:

Alternatively, as is shown in FIG. 4C, a model 455-2 may include exposure scores for each of a plurality of parcels or properties within the region 400. For example, as is shown in FIG. 4C, the model 455-2 includes exposure scores for portions or sectors that correspond to defined areas of land within the region 400, including one or more regions having dwellings or other structures thereon, and are not regularly sized or shaped. Like the model 455-1 of FIG. 4B, the model 455-2 of FIG. 4C indicates exposure scores of 1 for portions or sectors of the region 400 that lie below the route traveled by the aerial vehicle 410, and exposure scores of 0 for portions or sectors of the region 400 that do not lie below the route. Once the model 455-2 has been generated, one or more routes or paths for aerial vehicles may be selected based at least in part on the model 455-2.

Figure 4D:
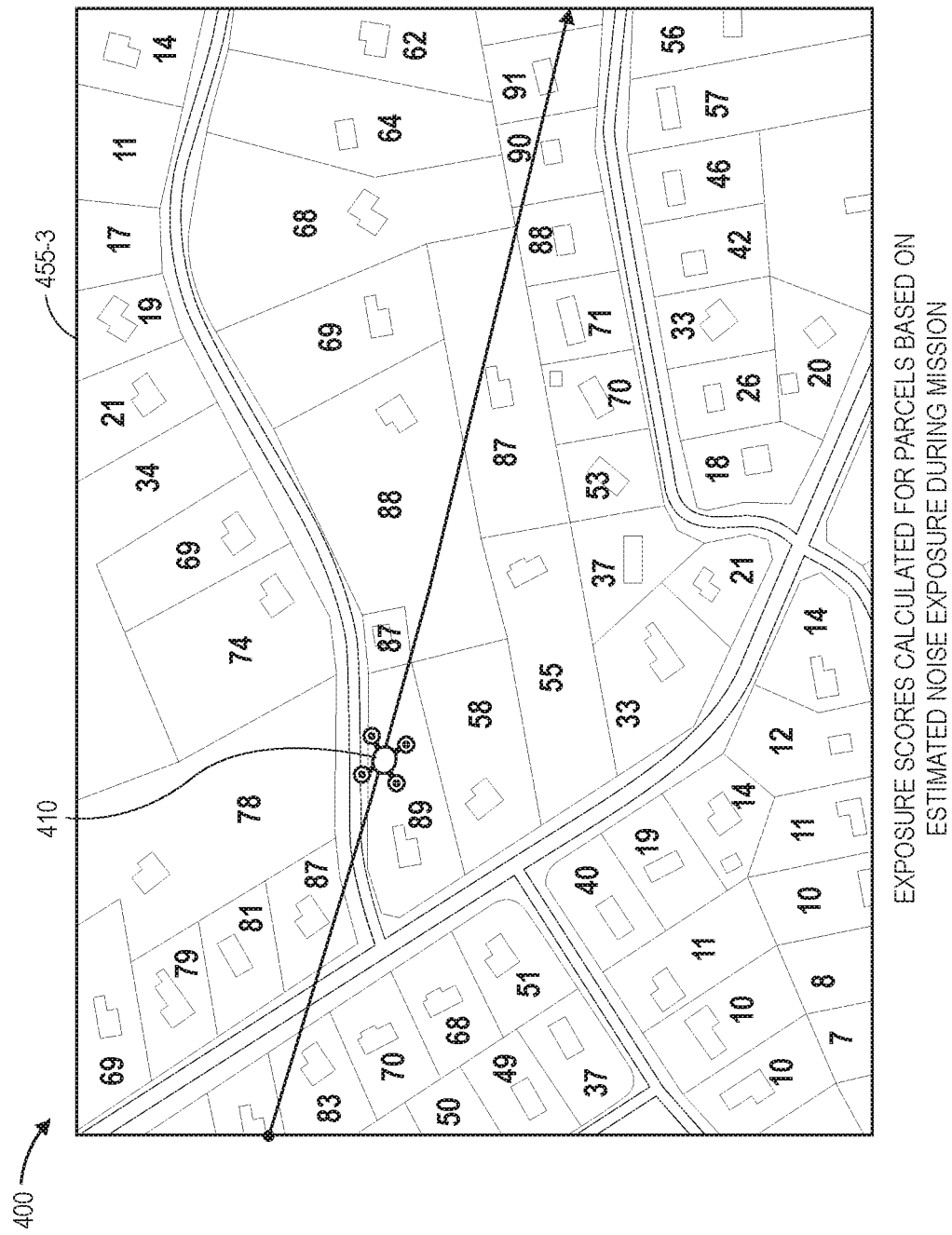

In some embodiments, a model may be generated for a region based on intrinsic or extrinsic factors or attributes associated with flight operations within the region, including but not limited to sounds radiated from aerial vehicles during such flight operations. As is shown in FIG. 4D, a model 455-3 includes exposure scores for portions or sectors that, like the model 455-2 of FIG. 4C, correspond to defined areas of land within the region 400, including one or more regions having dwellings or other structures thereon, and are not regularly sized or shaped. The exposure scores of FIG. 4D, however, are calculated for the parcels or properties based on the estimated noise exposure at such parcels or properties during the mission of the aerial vehicle 410. For example, the exposure scores at such parcels or properties may be calculated based on a number of decibels or other measure of intensity (e.g., sound pressure levels) of sounds radiated by the aerial vehicle 410 during the mission or, alternatively or additionally, one or more frequencies (e.g., frequency spectra) of such sounds. Once the model 455-3 has been generated, one or more routes or paths for aerial vehicles may be selected based at least in part on the model 455-3.

As is also discussed above, exposure scores represented in models may be updated based on information or data regarding missions of aerial vehicles that are subsequently performed in regions for which the models are generated. For example, exposure scores calculated for locations within a region may accumulate, or increase in number or value, where one or more aerial vehicles pass over or near such locations, and a model including such exposure scores may be updated accordingly. Referring to FIGS. 5A through 5D, views of aspects of systems for selecting flight routes based on historical exposure in accordance with embodiments of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4D, by the number "2" shown in FIG. 2 or by the number "1" shown in FIGS. 1A through 1F.

Figure 5A:
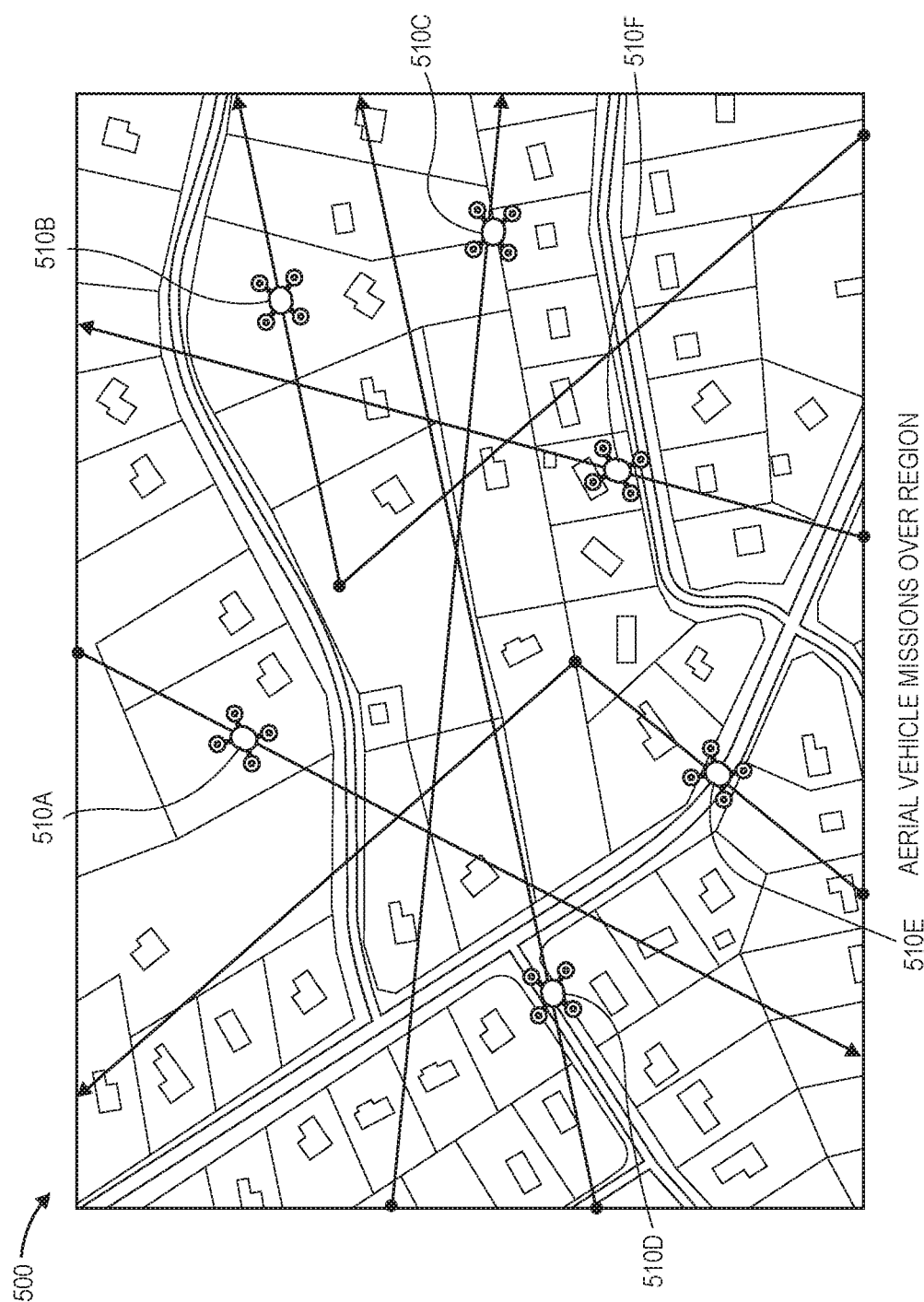
FIGS. 5A through 5D are views of aspects of systems for selecting flight routes based on historical exposure in accordance with embodiments of the present disclosure.

As is shown in FIG. 5A, a plurality of aerial vehicles 510A, 510B, 510C, 510D, 510E, 510F perform missions such as deliveries, monitoring operations, or responses to issues affecting safety within a region 500. The aerial vehicles 510A, 510B, 510C, 510D, 510E, 510F perform such missions while traveling along routes having one or more paths, and the region may include locations having one or more dwellings or other structures, as well as locations lacking any dwellings or structures.

Figure 5B:
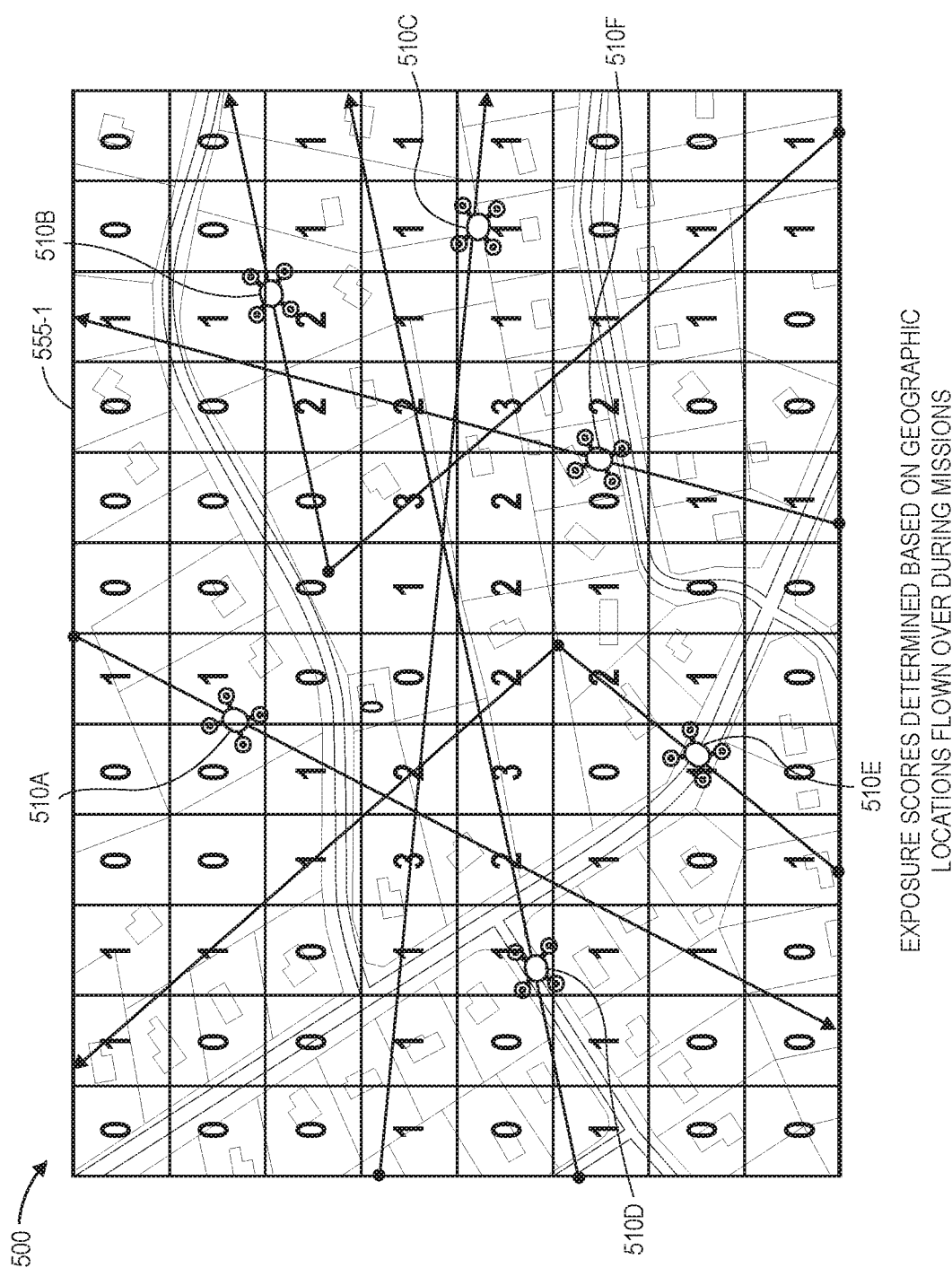

As is shown in FIG. 5B, a model 555-1 of the region 500 depicts exposure scores that are determined based on geographic locations within the region 500 that were flown over or near during the performance of the missions by the aerial vehicles 510A, 510B, 510C, 510D, 510E, 510F. For example, as is shown in FIG. 5B, and as with the model 455-1 of FIG. 4B, the model 555-1 indicates exposure scores in the form of integers corresponding to numbers of times routes or paths of aerial vehicles (e.g., the aerial vehicles 510A, 510B, 510C, 510D, 510E, 510F) have traveled over or near portions or sectors of the region 500 that are regularly sized and shaped, e.g., in a grid. In some embodiments, the exposure scores for such portions or sectors may be accumulated over time, and a route or path for an aerial vehicle may be selected based on minimum values of the exposure scores, in order to minimize flight exposure at such portions or sectors. In some other embodiments, the exposure scores may be permitted to degrade over time, e.g., according to one or more decay functions, to reflect the recency with such portions or sectors have been subjected to flight exposure.

Figure 5C:
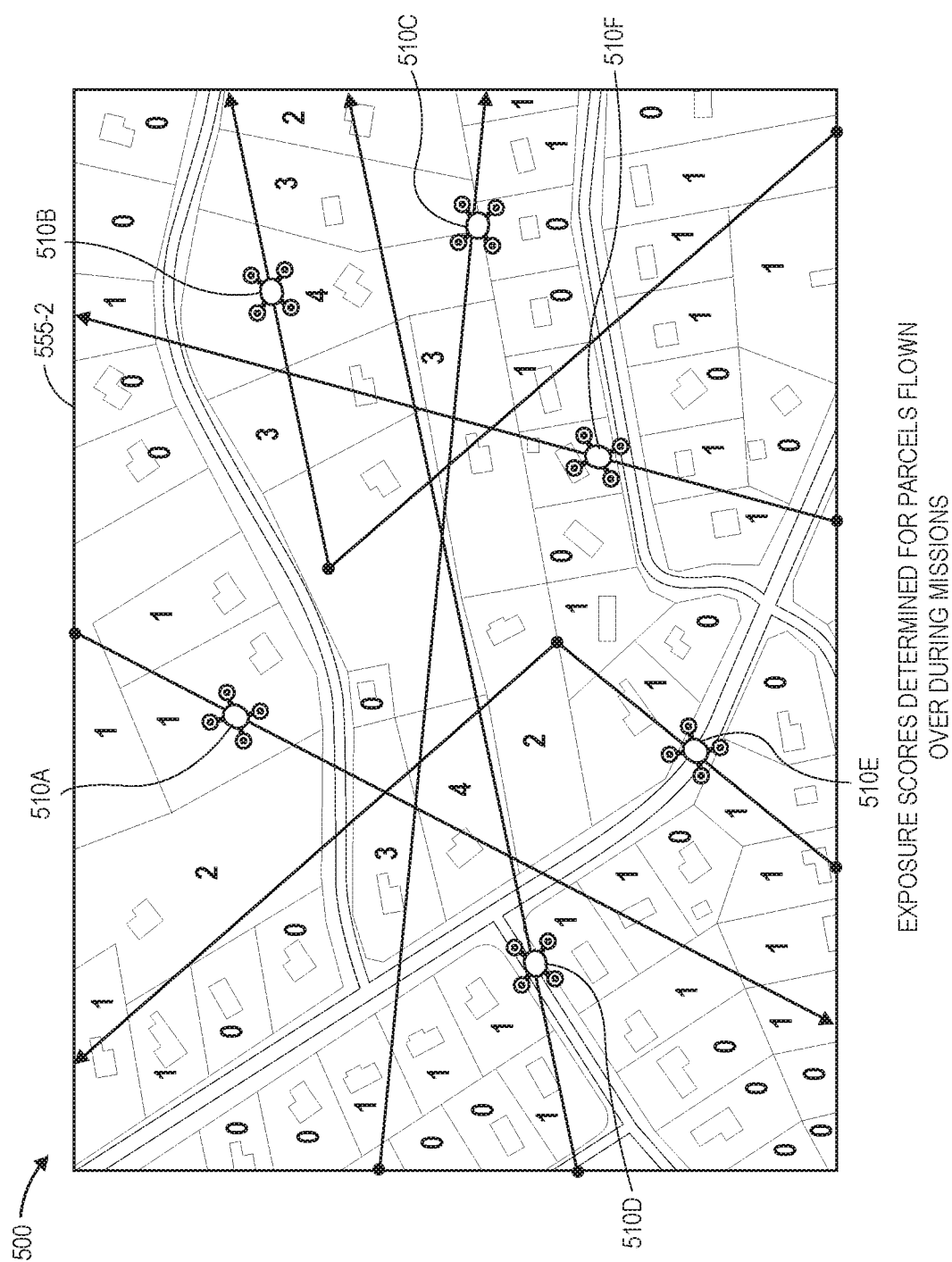

As is shown in FIG. 5C, a model 555-2 may include exposure scores for each of a plurality of parcels or properties within the region 500. For example, as is shown in FIG. 5C, the model 555-2 includes exposure scores for portions or sectors that correspond to defined areas of land within the region 500, including one or more regions having dwellings or other structures thereon, and are not regularly sized or shaped. Like the model 555-1 of FIG. 5B, the model 555-2 of FIG. 5C indicates exposure scores in the form of integers corresponding to numbers of times routes or paths of aerial vehicles (e.g., the aerial vehicles 510A, 510B, 510C, 510D, 510E, 510F) have traveled over or near portions or sectors of the region 500 that correspond to defined areas of land within the region 500, including one or more regions having dwellings or other structures thereon, and, are not regularly sized or shaped. In some embodiments, the exposure scores for such portions or sectors may be accumulated over time, and a route or path for an aerial vehicle may be selected based on minimum values of the exposure scores, in order to minimize flight exposure at such portions or sectors. In some other embodiments, the exposure scores may be permitted to degrade over time, e.g., according to one or more decay functions, to reflect the recency with such portions or sectors have been subjected to flight exposure.

Figure 5D:
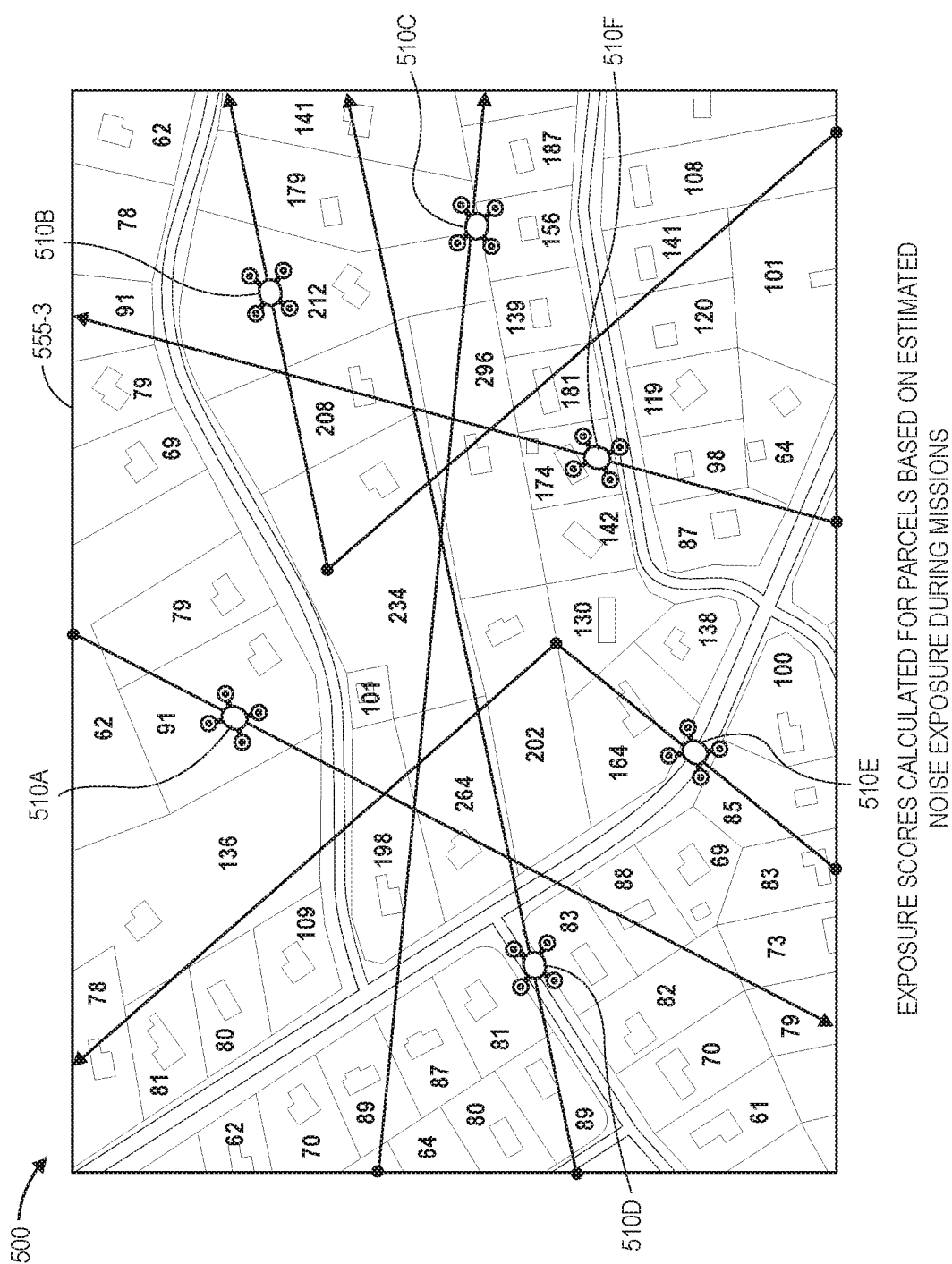

Likewise, as is shown in FIG. 5D, a model 555-3 includes exposure scores for portions or sectors that, like the model 555-2 of FIG. 5C, correspond to defined areas of land within the region 500, including one or more regions having dwellings or other structures thereon, and are not regularly sized or shaped. The exposure scores of FIG. 5D, however, are calculated for the parcels or properties based on the estimated noise exposure at such parcels or properties during the mission of the aerial vehicle 410. For example, the exposure scores at such parcels or properties may be calculated based on a number of decibels or other measure of intensity (e.g., sound pressure levels) of sounds radiated by the aerial vehicles 510A, 510B, 510C, 510D, 510E, 510F during the missions or, alternatively or additionally, one or more frequencies (e.g., frequency spectra) of such sounds. Once the model 555-3 has been generated, one or more routes or paths for aerial vehicles may be selected based at least in part on the model 555-3. In some embodiments, the exposure scores for such portions or sectors may be accumulated over time, and a route or path for an aerial vehicle may be selected based on minimum values of the exposure scores, in order to minimize flight exposure at such portions or sectors. In some other embodiments, the exposure scores may be permitted to degrade over time, e.g., according to one or more decay functions, to reflect the recency with such portions or sectors have been subjected to flight exposure.

Alternatively, one or more of the exposure scores shown in the models 455-1, 455-2, 455-3 of FIGS. 4A through 4D or the models 555-1, 555-2, 555-3 of FIGS. 5A through 5D may be generated at least in part on outputs received from one or more machine learning tools, systems or techniques, in response to inputs in the form of position data, operating characteristics, environmental conditions and noise emissions received from aerial vehicles, or other information or data.

Figure 6A:
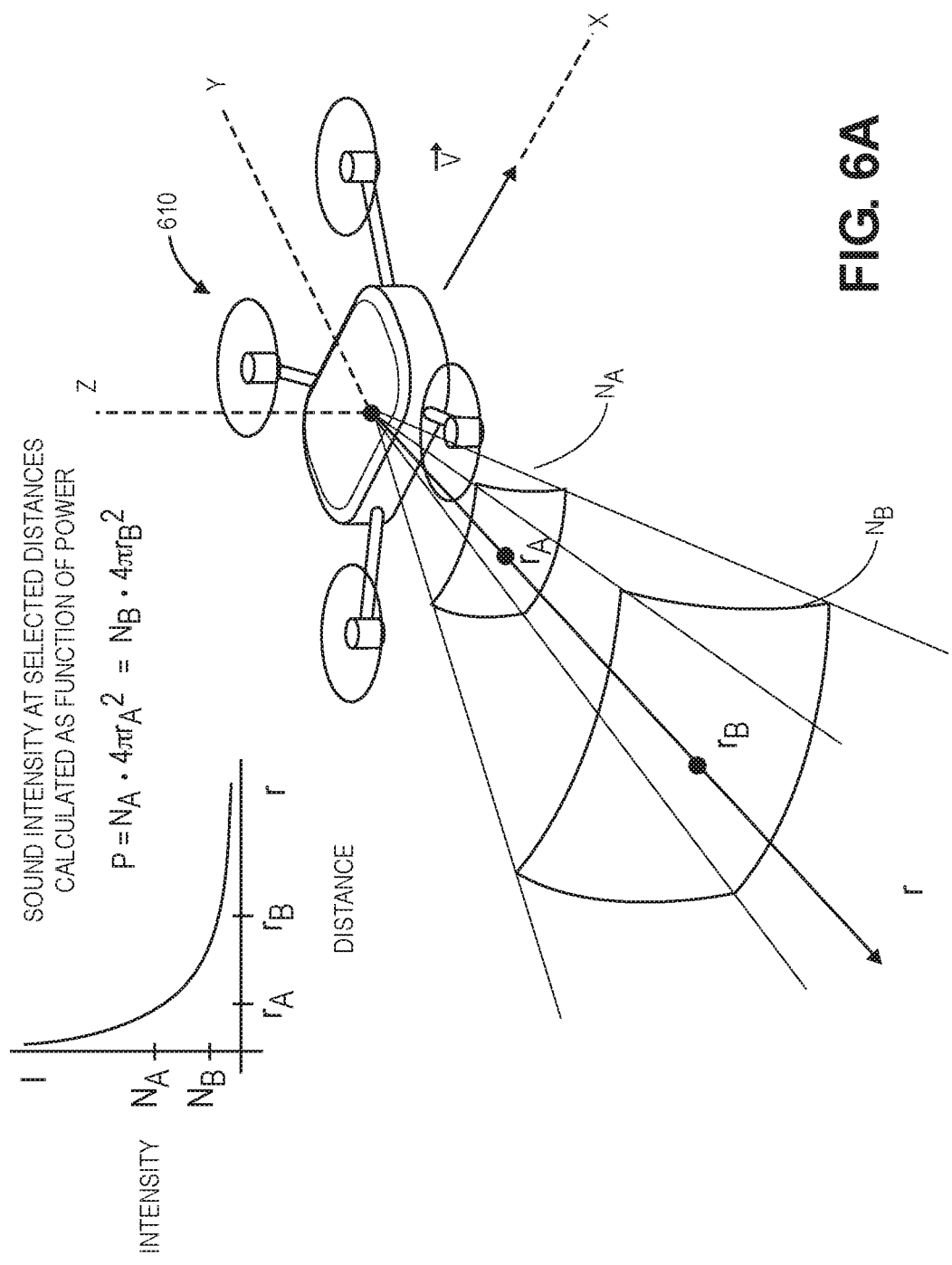
Figure 6B:
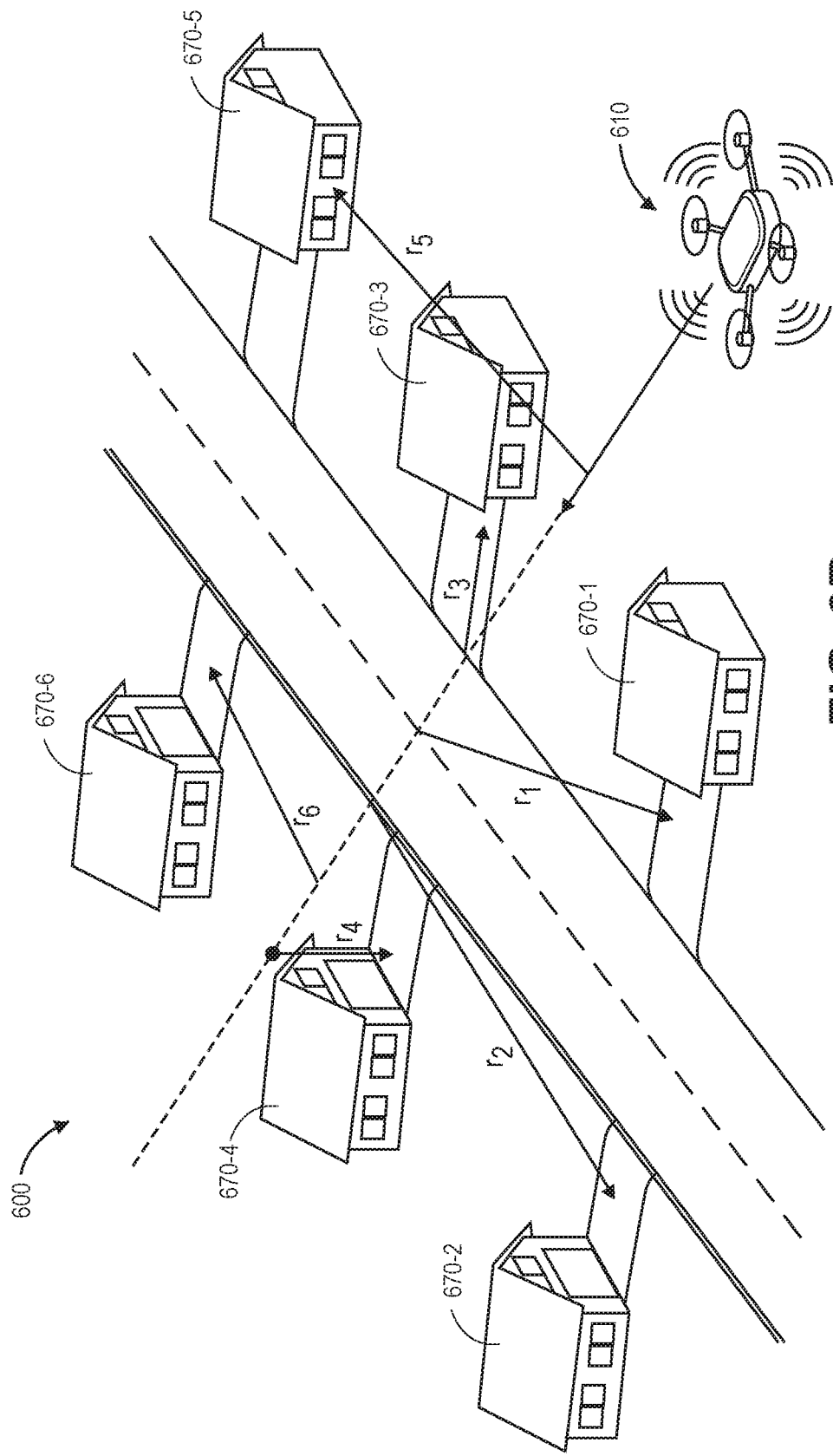

As is discussed above, information or data regarding sounds radiated by an aerial vehicle in flight may be captured and used to determine an extent to which a given location has been exposed to noise. Referring to FIGS. 6A through 6C, views of aspects of systems for selecting flight routes based on historical exposure in accordance with embodiments of the present disclosure are shown. Except where otherwise noted, reference numerals preceded by the number "6" shown in FIGS. 6A through 6C indicate components or features that are similar to components or features having reference numerals preceded by the number "5" shown in FIGS. 5A through 5D, by the number "4" shown in FIGS. 4A through 4D, by the number "2" shown in FIG. 2, or by the number "1" shown in FIGS. 1A through 1F.

As is shown in FIG. 6A, an aerial vehicle 610 is traveling at a velocity V (e.g., a course and an airspeed) at a position (x, y, z) in three-dimensional space. The operation of the aerial vehicle 610 results in the radiation of sound having intensities that vary with respect to a distance from the source, according to the inverse square law. In particular, intensity N of sound at a given distance r from a source of the sound is equal to a quotient of a power P of the source and a product of four multiplied by the mathematical constant pi, or π, and a square of the distance ($4\pi r^2$), or $$N = P/4\pi r^2$$

Thus, the intensity of sound at a given distance from a source is inversely proportional to a square of the distance. As is shown in FIG. 6A, the power P is equal to a product of an intensity $N_A$ of the sound at a distance $r_A$ from the aerial vehicle 610 and four times the mathematical constant pi and the square of the distance $r_A$, and also equal to a product of an intensity $N_B$ of the sound at a distance $r_B$ from the aerial vehicle 610 and four times the mathematical constant pi and the square of the distance $r_B$, or $$P = N_A \cdot (4\pi r_A^2) = N_B \cdot (4\pi r_B^2)$$

Therefore, where a power of a source of a sound, or an intensity of the sound at a given distance from the source, is known, an intensity of the sound may be determined at any distance from the source, according to the inverse square law. Accordingly, as is shown in FIG. 6B, where the aerial vehicle 610 is operating, an intensity level of the noise at various ground-based locations may be determined based on a power level of a source of noise radiated from the aerial vehicle 610 or based on an intensity of the noise determined at a fixed distance from the source, e.g., by one or more onboard or ground-based acoustic sensors. The power level of the source of noise (or an intensity of the noise determined at a given distance from the source of the noise) may then be used to calculate ground-level exposures to noise within a region 600 at a variety of locations 670-1, 670-2, 670-3, 670-4, 670-5, 670-6 at various distances $r_1$, $r_2$, $r_3$, $r_4$, $r_5$, $r_6$ from positions of the aerial vehicle 610 while operating in flight in the region 600, according to the inverse square law. The intensity levels calculated according to the inverse square law may then be transmitted to one or more servers or other computer-based systems and used to select or modify one or more routes or paths.

Alternatively, or additionally, the extent of noise exposure at a given location may be determined based on one or more ground-based sensors, or according to one or more models. For example, as is shown in FIG. 6C, in some embodiments, an intensity level of noise emitted by the aerial vehicle 610 at one or more points corresponding to the location 670-4 may be calculated according to the inverse square law, e.g., based on a power level of a source of the noise and a distance $r_4$ between the aerial vehicle 610 and the location 670-4. Alternatively, an intensity level of noise emitted by the aerial vehicle 610 may be measured at one or more points associated with the location 670-4 by one or more acoustic sensor 675-4, which may be located inside one or more structures (e.g., a dwelling) at the location 670-4, or external to such structures. For example, as is shown in FIG. 6C, the acoustic sensor 675-4 may be an integral component or part of a smart speaker located within the one or more structures at the location 670-4. Information or data regarding noise exposure at the location 670-4, which may be calculated, e.g., according to the inverse square law, or measured, e.g., by the acoustic sensor 675-4, may be used to determine whether a level of noise exposure at the location 670-4 is excessive or undue, or to select one or more routes or paths for aerial vehicles (not shown) that subsequently perform one or more missions within the region 600.

Information or data regarding flight exposure within a neighborhood or other region may be modeled and used to select an optimal route, or a modification to one or more paths of an optimal route, based on the flight exposure throughout the neighborhood or other region. Referring to FIGS. 7A through 7E, views of aspects of systems for selecting flight routes based on historical exposure in accordance with embodiments of the present disclosure are shown. Except where otherwise noted, reference numerals preceded by the number "7" shown in FIGS. 7A through 7E indicate components or features that are similar to components or features having reference numerals preceded by the number "6" shown in FIGS. 6A through 6C, by the number "5" shown in FIGS. 5A through 5D, by the number "4" shown in FIGS. 4A through 4D, by the number "2" shown in FIG. 2, or by the number "1" shown in FIGS. 1A through 1F.

Figure 7A:
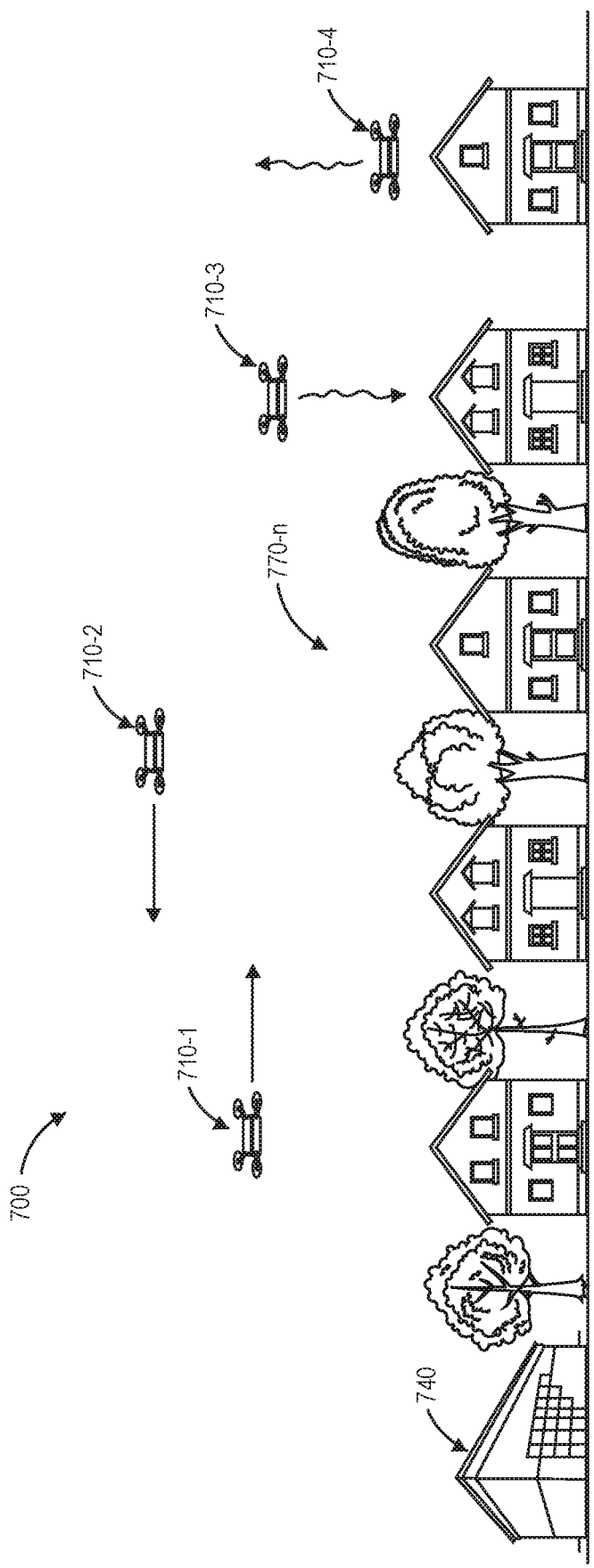
FIGS. 7A through 7E are views of aspects of one system for selecting flight routes based on historical exposure in accordance with embodiments of the present disclosure.
Figure 7B:
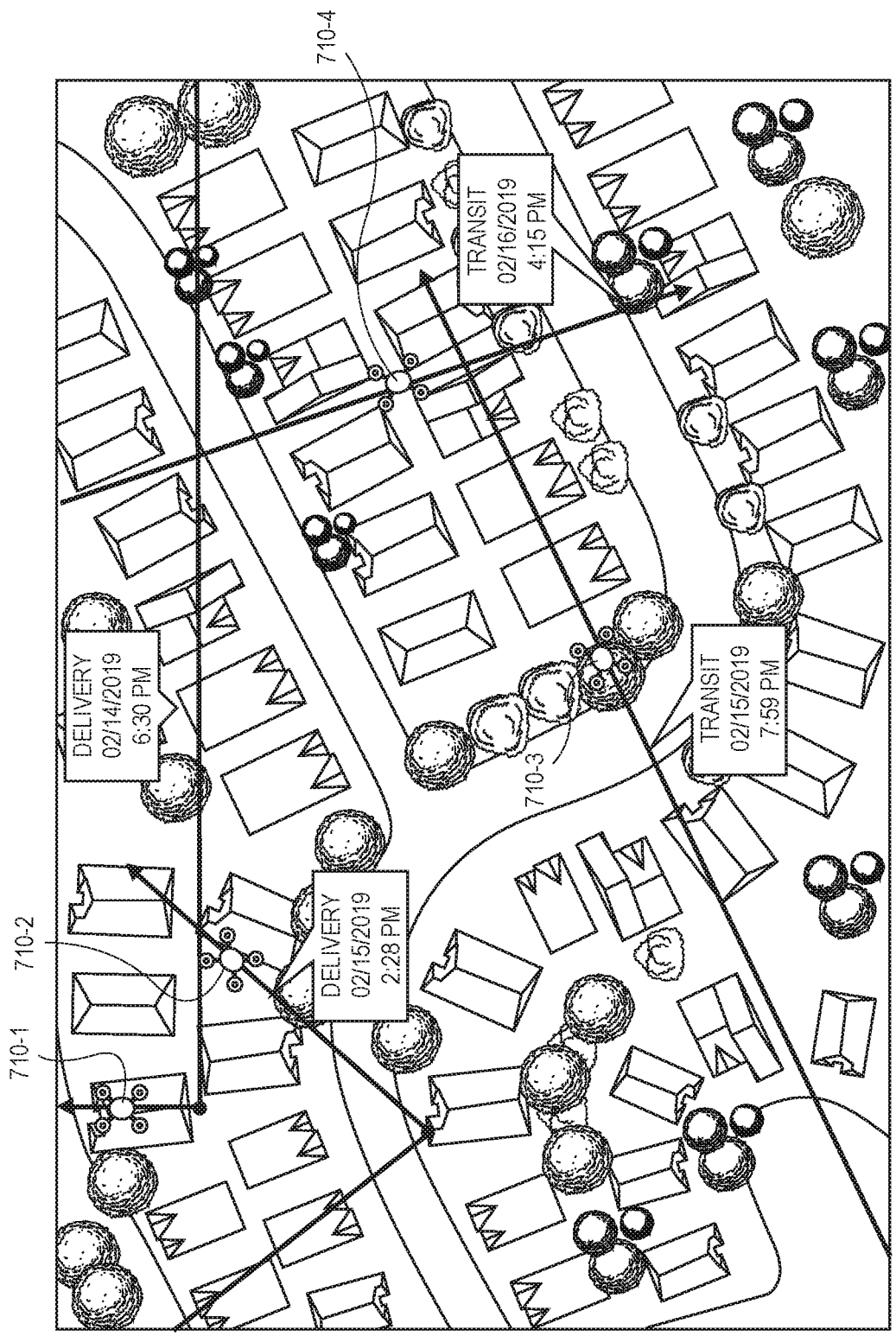

As is shown in FIG. 7A, a neighborhood or other region 700 includes a fulfillment center 740 and a plurality of homes 770-$n$. The plurality of aerial vehicles 710-1, 710-2, 710-3, 710-4 are engaged in flight operations over the neighborhood 700. For example, as is shown in FIG. 7B, the aerial vehicle 710-1 and the aerial vehicle 710-2 conducted deliveries to one or more of the homes 770-$n$. Additionally, as is also shown in FIG. 7B, the aerial vehicle 710-3 and the aerial vehicle 710-4 transited over one or more of the homes 770-$n$, e.g., from one or more origins to one or more destinations that are located outside of the neighborhood 700. Furthermore, as is discussed above with regard to FIGS. 6A through 6C, one or more of the aerial vehicles 710-1, 710-2, 710-3, 710-4 may calculate or measure information or data regarding sounds that are radiated by the aerial vehicles 710-1, 710-2, 710-3, 710-4 during the flight operations, and such information or data may be used to determine exposures to noise at one or more of the homes 770-$n$. Alternatively, or additionally, such flight operations may include but are not limited to monitoring operations, critical issues affecting public or private safety, or any other operations.

Figure 7C:
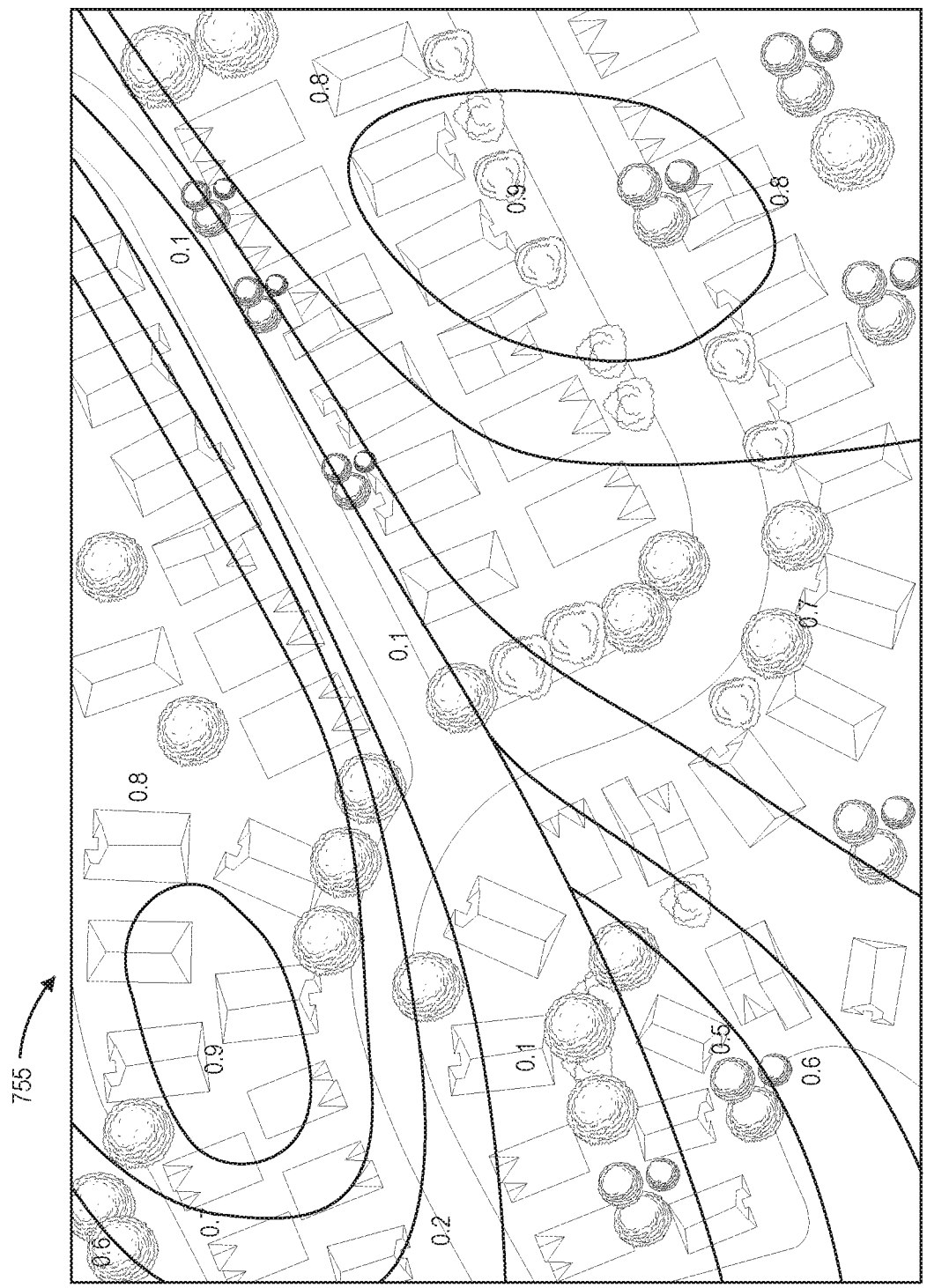

Based on the exposure to noise experienced by the homes 770-$n$, a model 755 of the neighborhood 700 may be generated. As is shown in FIG. 7C, the model 755 includes values representing exposure to noise in various areas of the neighborhood 700. For example, the model 755 indicates high levels of exposure to noise near areas where the routes traveled by the aerial vehicles 710-3, 710-4 intersect, as well as areas around or near the homes 770-1, 770-2, or where the routes traveled by the aerial vehicles 710-1, 710-2 intersect. The model 755 also indicates low levels of exposure to noise near areas where the aerial vehicles 710-1, 710-2, 710-3, 710-4 did not travel. In some embodiments, the values of the model 755 may be accumulated over time to determine a total level of noise exposure throughout the neighborhood 700. Alternatively, in some embodiments, the values may be permitted to degrade over time, e.g., according to one or more decay functions, to reflect the recency with which the various homes 770-$n$ of the neighborhood 700 have been exposed to noise. Furthermore, in some embodiments, the values may be augmented based on additional information or data regarding exposure to noise within the neighborhood 700, e.g., due to subsequent flight operations within or over the neighborhood 700.

Figure 7D:
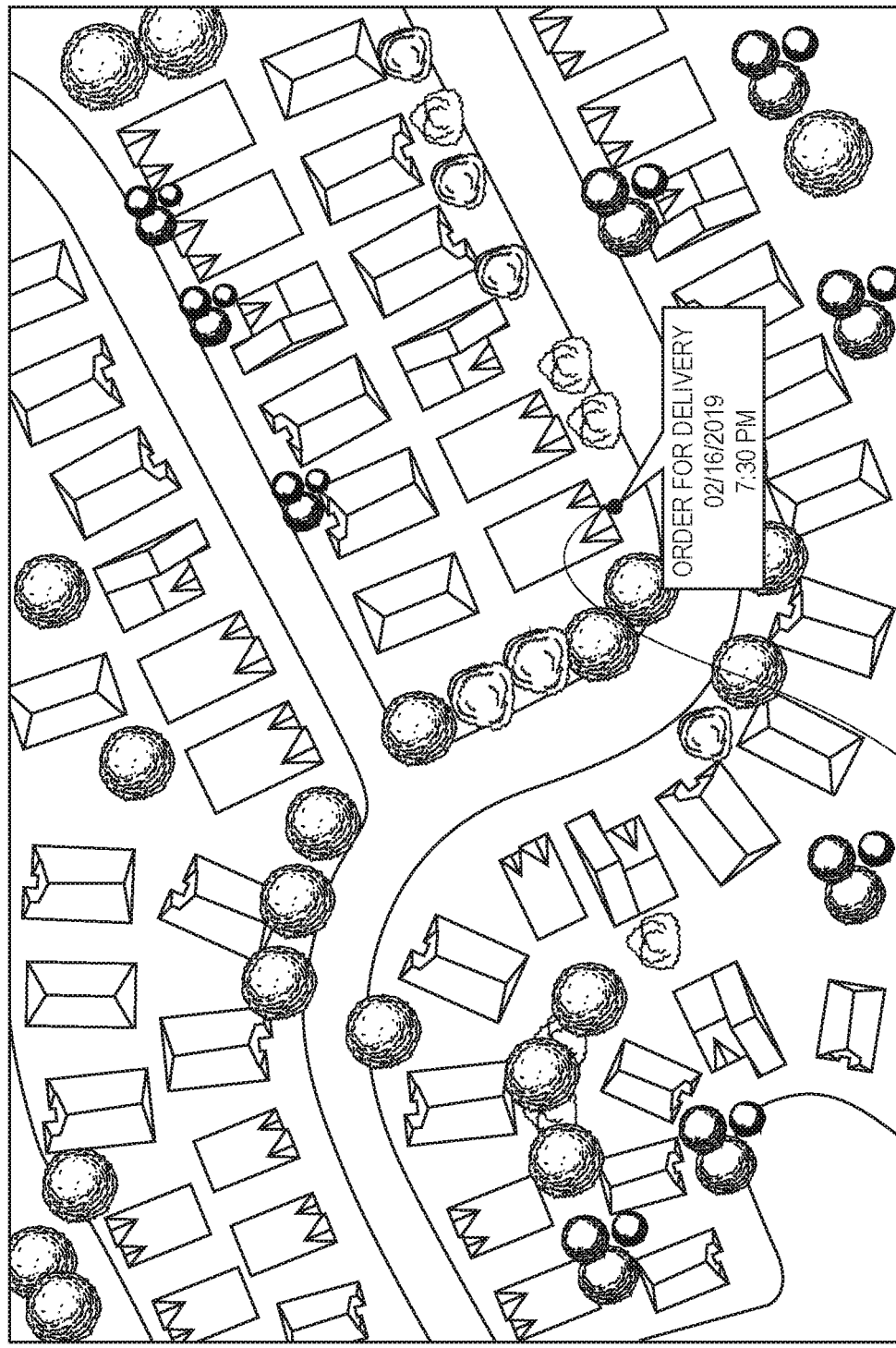
Figure 7E:
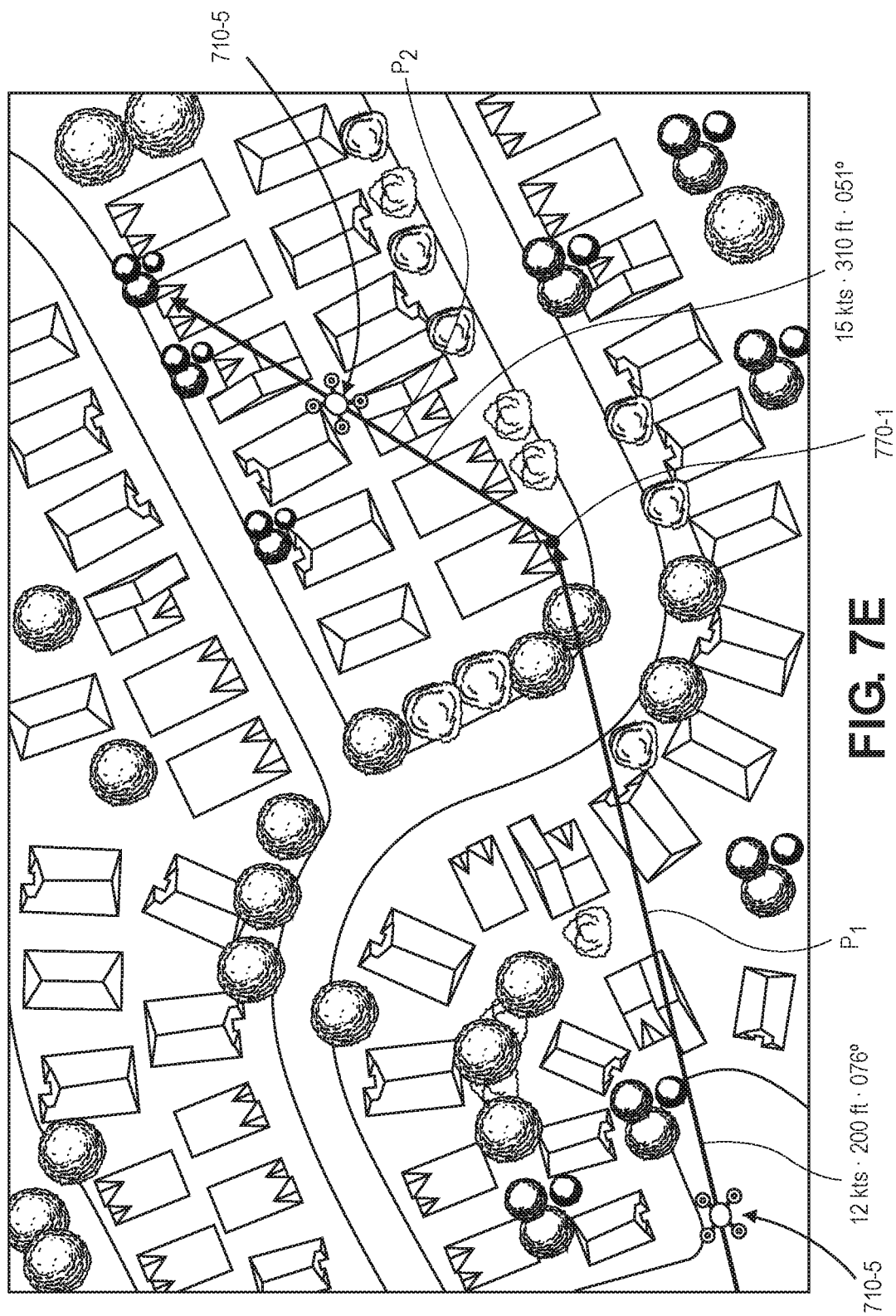

Once generated, the model 755 may be used to select an optimal route for performing one or more missions (e.g., deliveries) in the neighborhood 700. As is shown in FIG. 7D, an order is received for a delivery to a home 770-1 in the neighborhood 700. As is shown in FIG. 7E, an aerial vehicle 710-5 may be programmed to complete the delivery to the home 770-1 along a path $P_1$, and to depart from the home 770-1 along a path $P_2$. The paths $P_1$, $P_2$ may be selected based on values represented in the model 755 at a time when the order is received or, alternatively, estimated values represented in the model 755 at a time when the delivery is to be performed. For example, as is shown in FIGS. 7C and 7E, the paths $P_1$, $P_2$ call for travel over areas that have been subjected to low levels of exposure to noise, e.g., including areas where the aerial vehicles 710-1, 710-2, 710-3, 710-4 did not travel. In some embodiments, the values of the model 755 may be accumulated over time to determine a total level of noise exposure in the neighborhood 700.

As is discussed above, an optimal route for the performance of a mission by an aerial vehicle in a region (e.g., a neighborhood) may be modified based on information or data regarding exposure to flight operations (e.g., to noises emitted by aerial vehicles during such operations) at locations within a region. For example, where an optimal route is generated according to a traditional shortest path or shortest route algorithm, one or more paths of the optimal route may be modified based on information or data that is available regarding sounds radiated by aerial vehicles or any other sources within the region. Such information or data may be received and considered prior to the aerial vehicle embarking upon the mission or, alternatively, after the aerial vehicle has departed to perform the mission.

Figure 8:
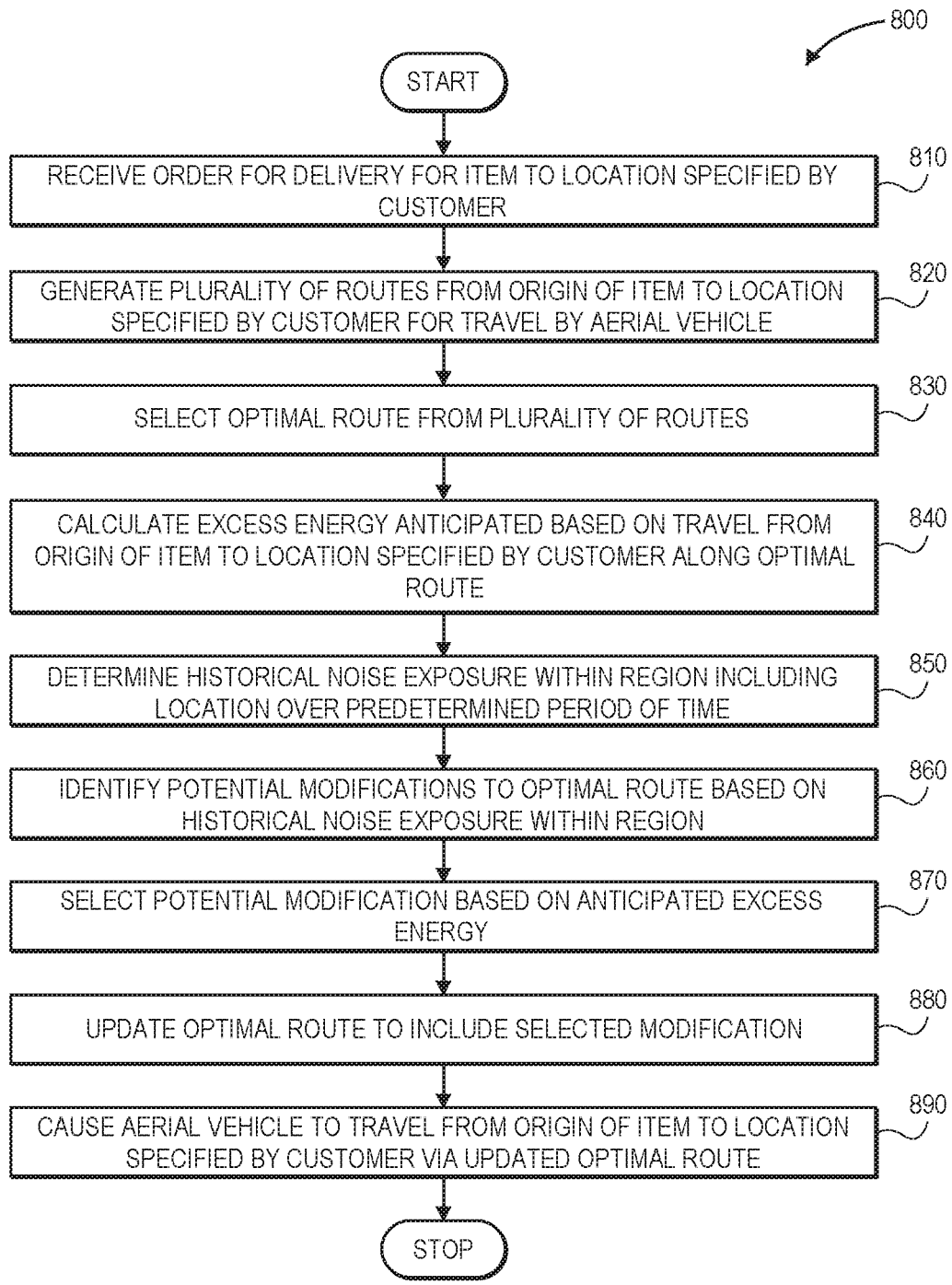
FIG. 8 is a flow chart of one process for selecting flight routes based on historical exposure in accordance with embodiments of the present disclosure.

Referring to FIG. 8, a flow chart 800 of one process for selecting flight routes based on historical exposure in accordance with embodiments of the present disclosure is shown. At box 810, an order for a delivery of an item to a location specified by a customer is received. For example, in some embodiments, the order may have been received via one or more user interfaces rendered by a computer device, such as a smartphone, a tablet computer, a laptop computer or a desktop computer. In some other embodiments, the order may be received by telephone, or in-person, e.g., at a bricks-and-mortar retail establishment. Alternatively, the systems and methods of the present disclosure may be initiated for reasons other than the placement of an order, such as by a request for an aerial vehicle to travel to a given location.

At box 820, a plurality of routes extending from an origin of the item to a location specified by the customer in the order are generated. The routes may be generated in any manner, e.g., according to one or more shortest route or shortest path algorithms, or any other algorithms, and may take into account any attributes of the order, or of an aerial vehicle that is to perform the mission. In some embodiments, each of the routes may include one or more paths on which the aerial vehicle is to travel, e.g., at a selected course, on a selected speed, or at a selected altitude, or based on any other factors or requirements, and the routes or paths may be selected with respect to any ground features or airspace restrictions. The routes may also identify one or more positions of the origin, the destination or any intervening waypoints.

At box 830, an optimal route is selected from the plurality of routes, and at box 840, excess energy that is estimated to be available based on the travel from the origin to the location specified by the customer along the optimal route is calculated. For example, the optimal route may be selected on any basis, including but not limited to a cost of fulfilling the order along the route, a time required to fulfill the order along the route, or an amount of energy required to fulfill the order along the route. An excess amount of energy may be calculated based on an amount of energy available to an aerial vehicle that has been or may be selected to fulfill the order via the optimal route, less an amount of energy that is estimated to fulfill the order by the aerial vehicle via the optimal route. The amounts of energy may be expressed in units, e.g., joules, watt-hours, British Thermal Units, or the like, or in measures of fuel or capacity associated with an aerial vehicle, e.g., amounts of liquid fuel such as gasoline or fractions of tank capacity, or amounts of charge on a battery or fractions of battery capacity, or in any other manner.

At box 850, historical noise exposures to ground-based locations along or near the optimal route are determined over a period of time. For example, historical levels of radiated sound during prior missions or travel of aerial vehicles along the route may be calculated based on information or data regarding such missions or travel, including but not limited to sounds radiated from the aerial vehicles during such missions or travel, as well as courses, speeds or altitudes traveled by the aerial vehicles (or orientations of the aerial vehicles) during such missions or travel, operating characteristics of such aerial vehicles or environmental conditions encountered during such missions or travel, or any other relevant factors. Alternatively, or additionally, sources of noise other than aerial vehicles may be considered in determining the noise exposures to the ground-based locations over the period of time. For example, where noise-generating construction activity is occurring on one or more locations along the optimal route, the effects of noise exposure resulting from the noise-generating construction activity may be considered in determining exposure to noise at such locations. Alternatively, in some embodiments, historical exposures to flight operations by aerial vehicles may be calculated without regard to sounds radiated by the aerial vehicles during such operations. For example, one or more exposure scores may be calculated for portions or sectors of a region based on routes or paths of aerial vehicles that pass over such portions or sectors, regardless of the sounds radiated by such aerial vehicles while traveling along the routes or paths.

At box 860, potential modifications to the optimal route may be identified based on the historical noise exposure at the ground-based locations along or near the optimal route. For example, where the optimal route would pass over, along or near one or more locations that have recently been exposed to noise, e.g., from one or more recent or prior missions or travel by aerial vehicles or any other noise, or along or near one or more locations that has been exposed to excessive amounts of noise in the aggregate, modifications to one or more paths of an optimal route that would cause the aerial vehicle to reduce sounds radiated in directions of such locations may be made. In some embodiments, a modification may include one or more of a change in altitude or a change in course that would increase distance or separation between the aerial vehicle and one or more of the locations, thereby reducing the level of noise exposure at such locations. In some other embodiments, a modification may include a change in airspeed or an operating characteristic of the aerial vehicle that would reduce an amount of sound radiated by the aerial vehicle in directions of such locations. For example, such a change may result from operating a propulsion motor at a slower rotational speed, or operating the propulsion motor or any propellers coupled thereto in a quieter mode or manner. The potential modifications may take into account the noise exposure to the ground-based locations along or near the optimal route, or the noise exposure at other ground-based locations, including but not limited to ground-based locations along or near one or more alternate paths included in a potential modification.

At box 870, potential modifications identified at box 860 are selected based at least in part on the excess energy associated with travel along the optimal route. For example, where an optimal route would consume forty percent of battery charge or fuel aboard an aerial vehicle, leaving the aerial vehicle with sixty percent excess energy, a modification that reduces noise exposure along the optimal route while consuming less than the sixty percent excess energy may be selected. Some factors that may be considered in selecting a potential modification include, but are not limited to, changes in times or durations of travel in fulfilling the order along the optimal route as modified, total noise exposure along the optimal route as modified, an amount of the excess energy that would be consumed in fulfilling the order along the optimal route as modified, or any other relevant factor, including but not limited to characteristics or attributes of the items included in the order.

At box 880, the optimal route is updated to include the selected modification. At box 890, an aerial vehicle is caused to travel from the origin of the item to the location specified by the customer via the updated optimal route, and the process ends.

Those of ordinary skill in the pertinent arts will recognize that modifications to optimal routes may be identified in any manner and by any device or system, including but not limited to a ground-based or "cloud"-based data processing system, or by one or more processors aboard the aerial vehicle. For example, the one or more modifications to the optimal route may be identified prior to the aerial vehicle taking off to fulfill the order, or while the aerial vehicle is in flight, such as when information or data regarding noise exposure along or near the optimal route is received after the aerial vehicle has taken off and embarked upon a mission to fulfill the order.

Figure 9A:
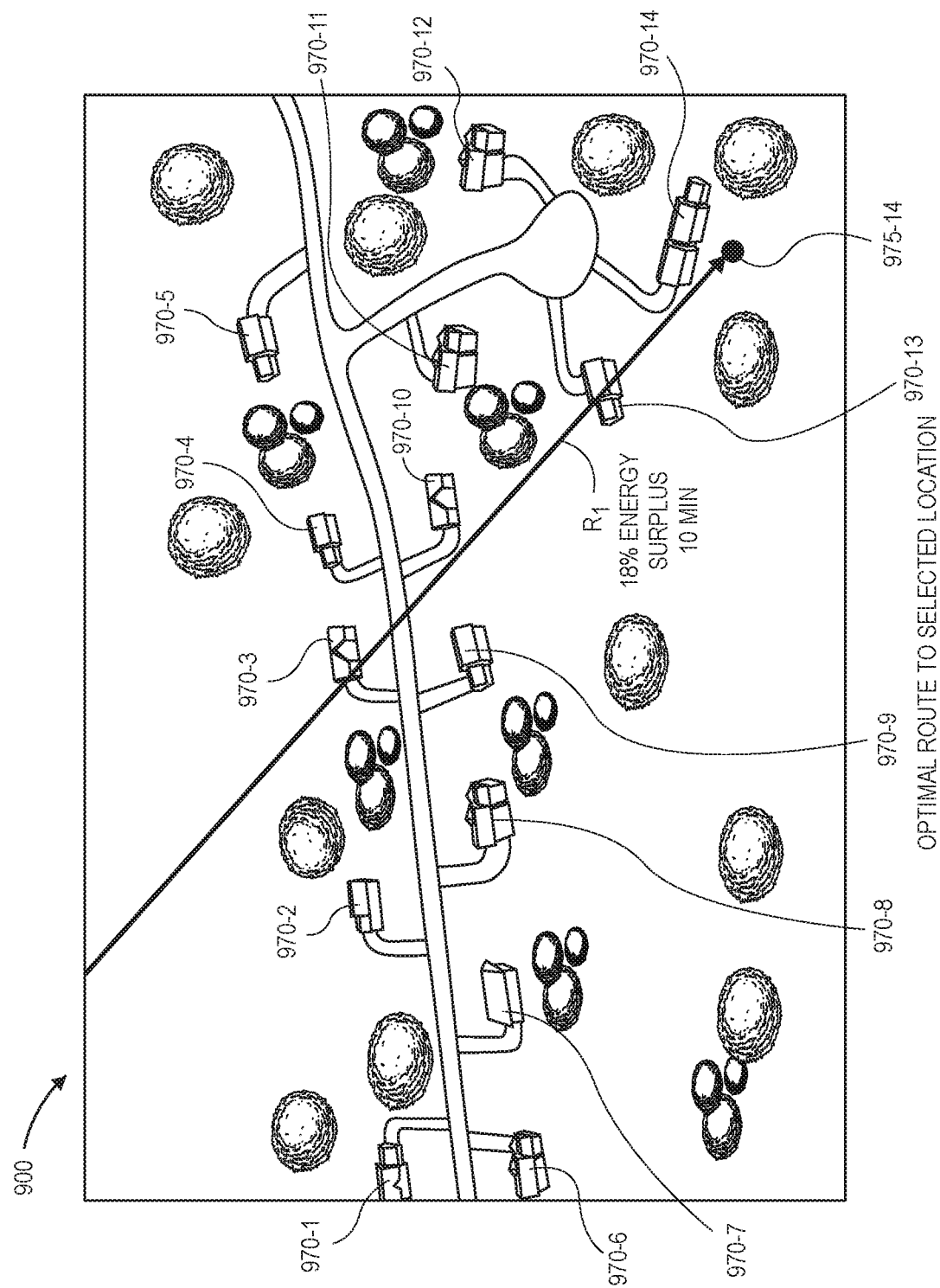
Figure 9B:
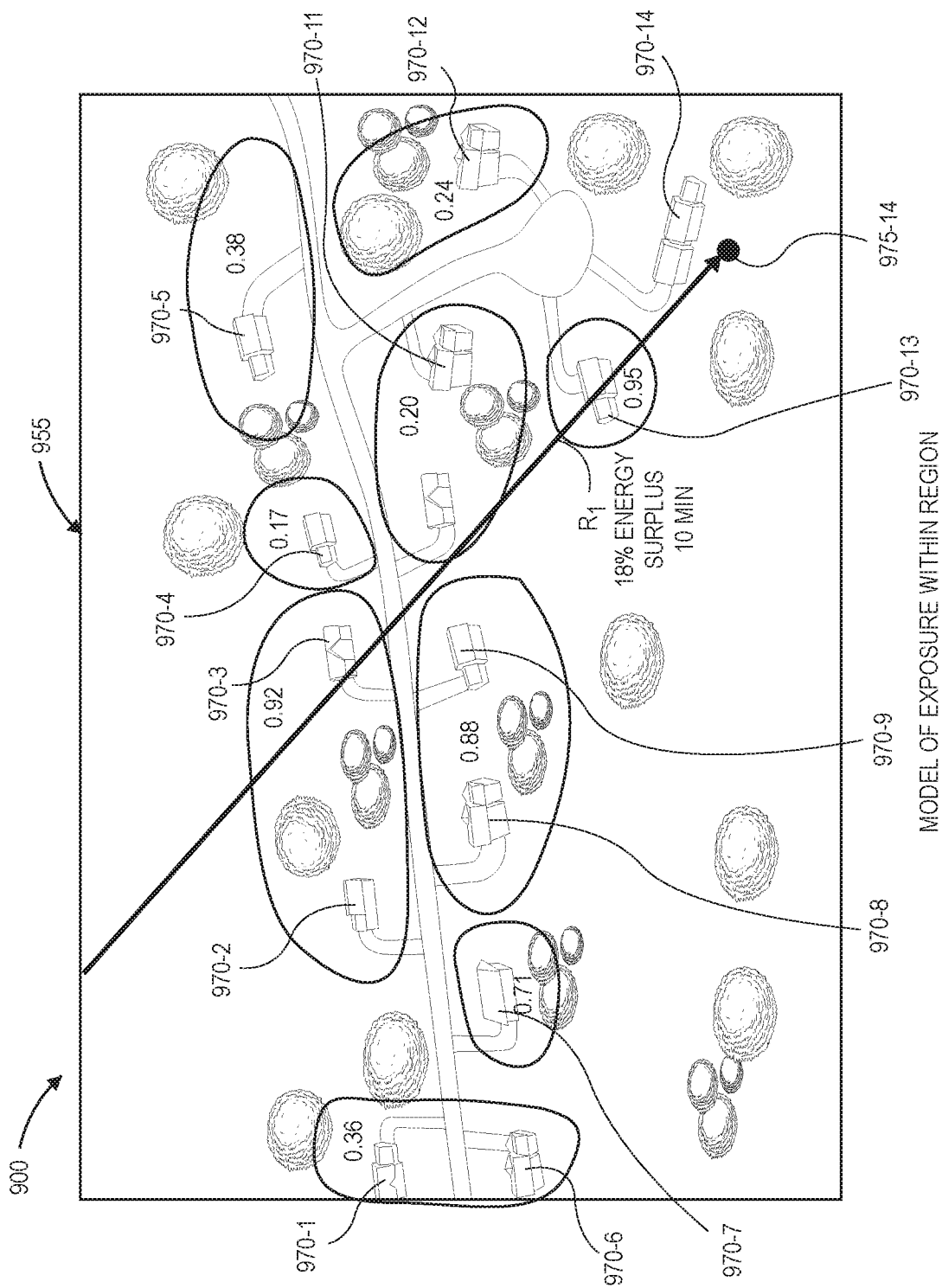

Referring to FIGS. 9A through 9C, views of aspects of one system for selecting flight routes based on historical exposure in accordance with embodiments of the present disclosure are shown. Except where otherwise noted, reference numerals preceded by the number "9" shown in FIGS. 9A through 9C indicate components or features that are similar to components or features having reference numerals preceded by the number "7" shown in FIGS. 7A through 7E, by the number "6" shown in FIGS. 6A through 6C, by the number "5" shown in FIGS. 5A through 5D, by the number "4" shown in FIGS. 4A through 4D, by the number "2" shown in FIG. 2, or by the number "1" shown in FIGS. 1A through 1F.

As is shown in FIG. 9A, a neighborhood 900 includes a plurality of homes 970-1, 970-2, 970-3, 970-4, 970-5, 970-6, 970-7, 970-8, 970-9, 970-10, 970-11, 970-12, 970-13, 970-14. An optimal route $R_1$ is generated for the performance of a mission by an aerial vehicle at a location 975-14 associated with one of the homes 970-14 in the neighborhood 900. The location 975-14 may be a yard, a driveway, a sidewalk, a road or street, a roof, a deck, a patio, or any other surface associated with the home 970-14. The optimal route $R_1$ may be determined in any manner, e.g., according to a shortest path or shortest route algorithm, or in any other manner. Alternatively, the optimal route $R_1$ may be calculated as a straight line between an origin (not shown) and the location 975-14, or as an arc of a circle (e.g., a great circle) that includes the origin and the location 975-14.

As is shown in FIG. 9B, a model 955 of the neighborhood 900 indicates exposure scores at locations within the neighborhood 900. As is discussed above, exposure scores may be calculated in any manner and on any basis following one or more prior operations by aerial vehicles within the neighborhood. For example, as is shown in FIG. 9B, a portion or sector of the neighborhood 900 including the homes 970-1, 970-6 has an exposure score of 0.36, while a portion or sector of the neighborhood 900 including the homes 970-2, 970-3 has an exposure score of 0.92, a portion or sector of the neighborhood 900 including the home 970-4 has an exposure score of 0.17, and a portion or sector of the neighborhood 900 including the home 970-5 has an exposure score of 0.38. Likewise, a portion or sector of the neighborhood 900 including the home 970-7 has an exposure score of 0.71, while a portion or sector of the neighborhood 900 including the home 970-8 has an exposure score of 0.88, a portion or sector of the neighborhood 900 including the home 970-11 has an exposure score of 0.20 and a portion or sector of the neighborhood 900 including the home 970-12 has an exposure score of 0.24. Meanwhile, a portion or sector of the neighborhood 900 including the home 970-13 has an exposure score of 0.95.

Thus, as is shown in FIG. 9B, the optimal route $R_1$ passes over or near portions or sectors of the neighborhood 900 having substantially high exposure scores, such as the portions or sectors of the neighborhood 900 including the homes 970-2, 970-3, 970-8, 970-9, 970-13. As is further shown in FIG. 9B, it is estimated that the mission to the location 975-14 may be completed by an aerial vehicle along the optimal route $R_1$ in ten minutes, and will result in an eighteen percent level of surplus energy.

As is discussed above, an optimal route may be modified based on information or data regarding exposure to noise in a region, such as the neighborhood 900, to avoid locations within the region that have been subjected to excessive noise over time, or locations within the region that have been recently subjected to noise. As is shown in FIG. 9C, a pair of routes $R_2$, $R_3$ are generated based on the exposure scores in the neighborhood 900, including specifically the values set forth in the model 955. For example, the route $R_2$ includes a pair of paths $P_{2A}$, $P_{2B}$ that avoid the portions or sectors of the neighborhood 900 that are subjected to high levels of exposure to noise, e.g., by traveling through a waypoint 945-2. The mission may be completed by an aerial vehicle along the route $R_2$ in eleven minutes, and will result in a nine percent level of surplus energy. Likewise, the route $R_3$ includes three paths $P_{3A}$, $P_{3B}$, $P_{3C}$ that also avoid the portions or sectors of the neighborhood 900 that are subjected to high levels of exposure to noise, e.g., by traveling through waypoints 945-3A, 945-3B. The mission may be completed by an aerial vehicle along the route $R_3$ in thirteen minutes, and will result in a five percent level of surplus energy.

Accordingly, one or more of the routes $R_2$, $R_3$ may be selected for performing the mission by an aerial vehicle based at least in part on the flight exposure within the neighborhood 900, e.g., the values represented in the model 955. For example, where maximizing surplus energy is a priority or is preferred, the route $R_3$ may be selected. Where minimizing time to complete the mission is a priority or is preferred, however, the route $R_2$ may be selected.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, in some embodiments, a path or a route may be modified by changing any aspect of an aerial vehicle's operations. For example, based on levels of noise exposure, a course, a speed, an altitude or any operating characteristic of an aerial vehicle may be selected or modified. The systems and methods of the present disclosure are not limited to merely selecting or changing course, speed or altitude, or selecting or changing operating characteristics.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more of the models of exposure to noise are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system for distributing items comprising:
a fulfillment center;
a plurality of aerial vehicles;
a server connected to a network, wherein the server is in communication with at least the fulfillment center and at least some of the plurality of aerial vehicles,
wherein the server is programmed with one or more instructions that, when executed, cause the server to at least:
receive a first order for a delivery of at least a first item to a first location, wherein the first location is within a neighborhood;
cause a first aerial vehicle to transport at least the first item from the fulfillment center to the first location via a first route comprising a first path having a first course, a first speed and a first altitude;
determine a level of exposure to noise at a first plurality of locations within the neighborhood during the delivery of the first item based at least in part on the first route and at least one of the first course, the first speed and the first altitude;
generate a model of the exposure to noise in the neighborhood based at least in part on the levels of exposure to noise at the first plurality of locations;
receive a second order for a delivery of at least a second item to a second location within the neighborhood;
generate a plurality of proposed routes for transporting at least the second item to the second location based at least in part on the model, wherein each of the plurality of proposed routes comprises a respective proposed path having a respective proposed course, a respective proposed speed and a respective proposed altitude;
determine energy surplus information associated with each of the plurality of proposed routes;
compare the energy surplus information associated with each of the plurality of proposed routes;
determine a second route having a second path, a second course, and a second speed based at least in part on the model and the comparison of the energy surplus information; and
cause a second aerial vehicle to transport at least the second item to the second location via the second route.

2. The system of claim 1, wherein the second path does not pass over or within a vicinity of the first location.

3. The system of claim 1, wherein each of the levels of exposure is calculated based at least in part on a power of sound radiated by the first aerial vehicle and a distance between the first aerial vehicle and one of the first plurality of locations.

4. The system of claim 1, wherein the one or more instructions, when executed, further cause the server to at least:
determine a level of exposure to noise at a second plurality of locations within the neighborhood during the delivery of at least the second item based at least in part on the second route and at least one of the second course, the second speed and the second altitude; and
update the model based at least in part on the levels of exposure to noise at the second plurality of locations;
receive a third order for a delivery of at least a third item to a second location within the neighborhood;
generate a third route for transporting the third item to the third location based at least in part on the updated model, wherein the third route comprises a third path having a third course, a third speed and a third altitude; and
cause a third aerial vehicle to transport at least the third item to the third location via the third route.

5. A method comprising:
receiving a request to perform a first mission by a first aerial vehicle, wherein the first mission requires travel to at least a first location within a region;
determining noise information regarding at least a second mission performed by a second aerial vehicle, wherein the second mission included travel to at least a second location within the region;
generating a plurality of proposed routes for performing the first mission;
determining energy surplus information associated with each of the plurality of proposed routes;
comparing the energy surplus information associated with each of the plurality of proposed routes;
selecting a first route from the plurality of proposed routes for the first mission based at least in part on the noise information regarding the second mission and the comparison of energy surplus information, wherein the first route comprises a first path, and wherein the first path does not pass over or near the second location;
programming the first aerial vehicle with at least a first set of instructions to perform the first mission at a first time; and
causing the first aerial vehicle to perform the first mission via at least the first route in accordance with the first set of instructions.

6. The method of claim 5, wherein selecting the first route comprises:
selecting at least one of a course, a speed, an altitude, or an orientation for traveling along the first path based at least in part on the noise information regarding the second mission,
wherein the first set of instructions, when executed by at least one processor of the first aerial vehicle, causes the first aerial vehicle to operate on the course, at the speed, at the altitude, or in the orientation.

7. The method of claim 5, further comprising:
calculating a plurality of exposure scores for a plurality of sectors of the region, wherein each of the plurality of exposure scores associates at least one of a plurality of missions with one of the plurality of sectors, and wherein the second mission is one of the plurality of missions; and
generating a model based at least in part on at least some of the plurality of exposure scores,
wherein the first route is selected based at least in part on an exposure score calculated for one of the plurality of sectors including the second location.

8. The method of claim 7, wherein the model is a two-dimensional representation comprising a grid defined with respect to at least a portion of the region, and
wherein the grid comprises the plurality of sectors.

9. The method of claim 7, wherein the model is a two-dimensional representation depicting a plurality of properties within at least a portion of the region, and wherein each of the plurality of sectors corresponds to one of the plurality of properties.

10. The method of claim 7, wherein each of the exposure scores is a number of instances in which an aerial vehicle passed over or near one of the plurality of sectors prior to the first time.

11. The method of claim 7, wherein each of the exposure scores is indicative of exposure to noise at one of the plurality of sectors prior to the first time.

12. The method of claim 11, wherein calculating the plurality of exposure scores comprises:
   determining, for each of the plurality of sectors, a distance between the second aerial vehicle and one of the plurality of sectors during the second mission; and
   determining, for each of the plurality of sectors, the exposure to noise based at least in part on the distance between the second aerial vehicle and the one of the plurality of sectors during the second mission.

13. The method of claim 5, wherein selecting the first route comprises:
   prior to the first time,
   selecting a second route from the plurality of proposed routes for the travel to at least the first location by the first aerial vehicle, wherein the second route comprises a second path comprising a second course, a second speed and a second altitude;
   determining that at least the second path passes over or near the second location; and
   in response to determining that at least the second path passes over or near the second location,
      generating the first path, wherein the first path comprises a first course, a first speed and a first altitude; and
      modifying the second route to include at least the first path, wherein the first route is the modified second route.

14. The method of claim 13, wherein
   the energy surplus information is a difference between a first amount of energy available to the first aerial vehicle prior to performing the first mission via the respective proposed route and a second amount of energy available to the first aerial vehicle after performing the first mission via the respective proposed route.

15. The method of claim 5, wherein determining the information regarding at least the second mission comprises:
   determining information regarding prior exposure to noise at a plurality of locations within the region, wherein the second location is one of the plurality of locations,
   wherein selecting the first route comprises:
   generating a plurality of routes between a third location and the first location based at least in part on at least one attribute of the first aerial vehicle, wherein each of the plurality of routes comprises at least one path, and wherein the first route is one of the plurality of routes; and
   determining, for each of the plurality of routes, a level of prior exposure to noise at locations within a vicinity of the at least one path of each of the plurality of routes, wherein the first route is the one of the plurality of routes having a lowest level of prior exposure to noise.

16. The method of claim 5, wherein determining the information regarding at least the second mission comprises:
   prior to the first time,
   causing a plurality of aerial vehicles to perform at least one mission, wherein the at least one mission includes travel over at least a portion of the region, wherein each of the plurality of aerial vehicles is caused to travel over the portion of the region via a route having at least one path, wherein the second aerial vehicle is one of the plurality of aerial vehicles, and wherein the at least one mission includes the second mission;
   determining, for at least some of the plurality of aerial vehicles, at least one of:
      a course of the at least one path;
      a speed along the at least one path;
      an altitude along the at least one path; or
      an operating characteristic while traveling along the at least one path;
   calculating information regarding exposure to noise at a plurality of locations within at least the portion of the region based at least in part on the course, the speed, the altitude, or the operating characteristic of the at least some of the plurality of aerial vehicles,
   wherein the second location is one of the plurality of locations, and
   wherein the first route is selected based at least in part on the information regarding the exposure to noise at the at least some of the plurality of locations.

17. The method of claim 5, wherein the first mission is a first delivery of at least a first item to the first location, and wherein the second mission is a second delivery of at least a second item to the second location.

18. A first aerial vehicle comprising:
   at least one propulsion motor;
   a transceiver; and
   a control system having at least one computer processor, wherein the control system is in communication with the transceiver and at least one propulsion motor, and wherein the control system is configured to perform a method comprising:
      receiving information regarding a first mission requiring travel by the first aerial vehicle from an origin to a destination at a first time;
      receiving information regarding missions performed by a plurality of aerial vehicles prior to the first time, wherein each of the missions required travel by at least one of the plurality of aerial vehicles over or near at least one portion of a region, and wherein the region includes the destination;
      generating a model based at least in part on the information regarding the travel by the plurality of aerial vehicles prior to the first time, wherein the model comprises at least one exposure score for the at least one portion of the region;
      determining, based at least in part on the model, that a first number of the plurality of aerial vehicles that traveled over or near a first location in the at least one portion of the region prior to the first time is less than a second number of the plurality of aerial vehicles that traveled over or near a second location in the at least one portion of the region prior to the first time;
      generating a plurality of proposed routes between the origin and the destination based at least in part on the model, wherein each of the plurality of proposed routes comprises a respective proposed path having a respective proposed course, a respective proposed speed and a respective proposed altitude, wherein each of the plurality of proposed routes passes over or near the first location, and does not pass over or near the second location;
      determining energy surplus information associated with each of the plurality of proposed routes;

comparing the energy surplus information associated with each of the plurality of proposed routes;

determining a first route having a first path, a first course, a first speed, and a first altitude based at least in part on the model and the comparison of the energy surplus information; and generating a first set of instructions for performing the first mission along the first route, and executing at least some of the first set of instructions to cause the first aerial vehicle to travel along at least the first path.

19. The first aerial vehicle of claim 18, wherein the method further comprises:

calculating, for each of a plurality of portions of the region, an exposure score based at least in part on the information regarding the travel by the plurality of aerial vehicles prior to the first time; and wherein determining that the first number of the plurality of aerial vehicles that traveled over or near the first location is greater than the second number of the plurality of aerial vehicles that traveled over or near the second location comprises:

determining that a first exposure score calculated for a first portion of the region including the first location is less than a second exposure score calculated for a second portion of the region including the second location, wherein the first path passes over the first portion, and wherein the first path does not pass over the second portion.

20. The first aerial vehicle of claim 18, wherein the first mission includes a delivery of at least one item to the destination, and wherein at least some of the missions include deliveries of items to locations within the region.

21. The first aerial vehicle of claim 18, wherein the information includes at least one of an intensity or a frequency of a noise radiated by each of the plurality of aerial vehicles.

* * * * *